US006901264B2

(12) United States Patent
Myr

(10) Patent No.: US 6,901,264 B2
(45) Date of Patent: May 31, 2005

(54) METHOD AND SYSTEM FOR MOBILE STATION POSITIONING IN CELLULAR COMMUNICATION NETWORKS

(75) Inventor: David Myr, Jerusalem (IL)

(73) Assignee: Makor Issues and Rights Ltd. (IL)

( * ) Notice: Subject to any disclaimer, the term of this patent is extended or adjusted under 35 U.S.C. 154(b) by 501 days.

(21) Appl. No.: 09/841,889

(22) Filed: Apr. 25, 2001

(65) Prior Publication Data

US 2002/0183069 A1 Dec. 5, 2002

(51) Int. Cl.[7] ................................................. H04Q 7/20
(52) U.S. Cl. .............................. 455/456.5; 455/456.1; 455/422.1; 342/387; 342/465
(58) Field of Search .......................... 455/456.5, 456.1, 455/422.1; 342/387, 465

(56) References Cited

U.S. PATENT DOCUMENTS

| | | | | |
|---|---|---|---|---|
| 5,293,645 | A | * | 3/1994 | Sood ....................... 455/456.2 |
| 5,883,598 | A | * | 3/1999 | Parl et al. .................. 342/457 |
| 5,987,329 | A | * | 11/1999 | Yost et al. ............... 455/456.1 |
| 6,070,079 | A | * | 5/2000 | Kuwahara ................ 455/456.2 |
| 6,249,253 | B1 | * | 6/2001 | Nielsen et al. ............. 342/463 |
| 6,327,473 | B1 | * | 12/2001 | Soliman et al. .......... 455/456.1 |
| 6,526,283 | B1 | * | 2/2003 | Jang ......................... 455/456.5 |
| 6,665,541 | B1 | * | 12/2003 | Krasner et al. ............ 455/502 |
| 6,697,629 | B1 | * | 2/2004 | Grilli et al. .............. 455/456.1 |
| 6,697,630 | B1 | * | 2/2004 | Corwith ...................... 455/457 |
| 2001/0022558 | A1 | * | 9/2001 | Karr et al. .................. 342/450 |
| 2002/0004398 | A1 | * | 1/2002 | Ogino et al. ................ 455/456 |
| 2003/0129996 | A1 | * | 7/2003 | Maloney et al. ............ 455/456 |

* cited by examiner

Primary Examiner—William Trost
Assistant Examiner—Sharad Rampuria
(74) Attorney, Agent, or Firm—Gerry J. Elman; Elman Technology Law, P.C.

(57) ABSTRACT

A system of cell phone positioning in real time is provided with specialized location device installations on multiplicity of base stations BSs in CDMA and TDMA cellular communication networks. The purpose of the positioning system is to enable tracking and locating large quantities of anonymous mobile cell phones MS in any number of network cells to be used for real time traffic-forecasting systems, emergency services E911, and other client-initiated position requests. Location data thus obtained can be continuously updated from vehicular-based cellular phones, collected, processed and used as a basis for input to intelligent transportation systems, such as real time urban traffic guidance for vehicular congestion and intelligent traffic control systems. The system is capable of covering large urban geographical areas and number of independent cell structures serving thousands of mobile cell phone clients. It is an independent plug-in solution with specialized synchronized location device installations in each cell BS. Centrally located specialized location software based on Time of Arrival (TOA) and Time Difference of Arrival (TDOA) methods for high speed location processing in central Location Database Server (LDS). The inventive system consists of number of component functions: Operator-initiated functions, location device functions and software enabled positioning functions.

10 Claims, 21 Drawing Sheets

Location Device Scheme 1

Fig. 1a  Location Device Scheme 1
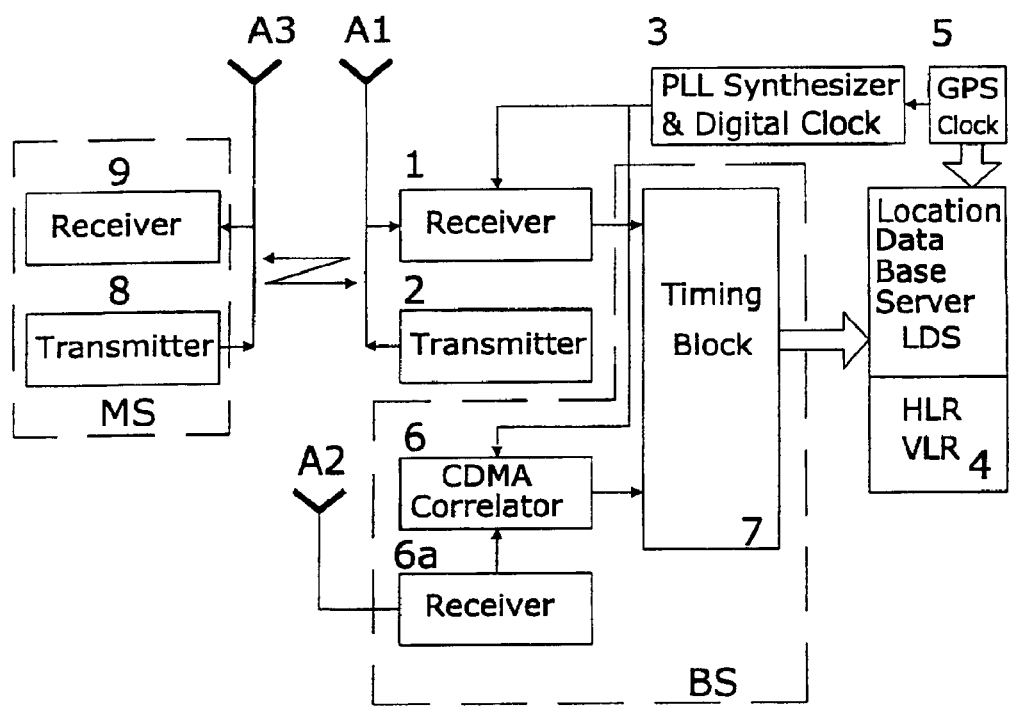

Fig. 1b  Location Device Scheme 2
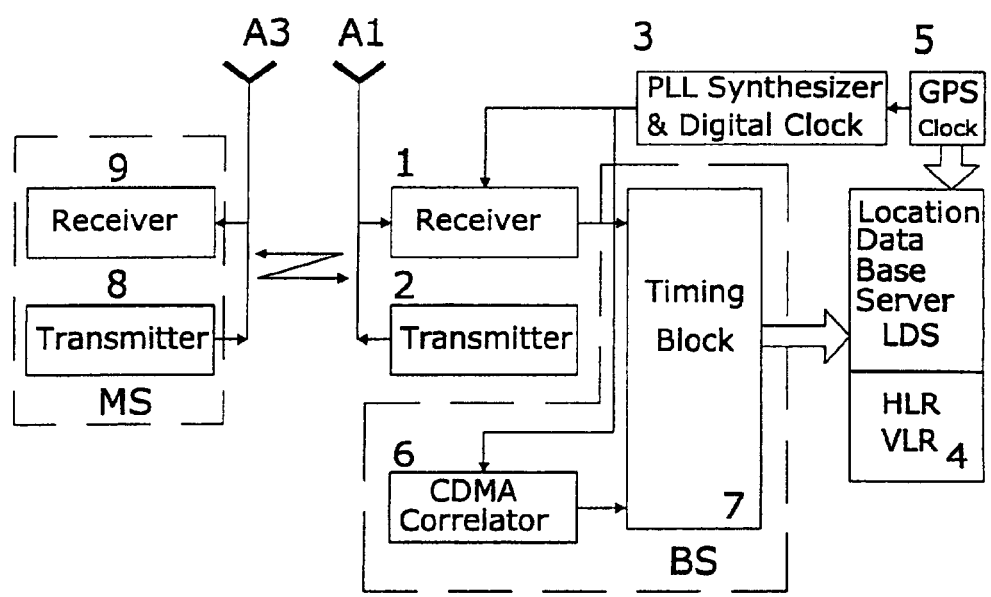

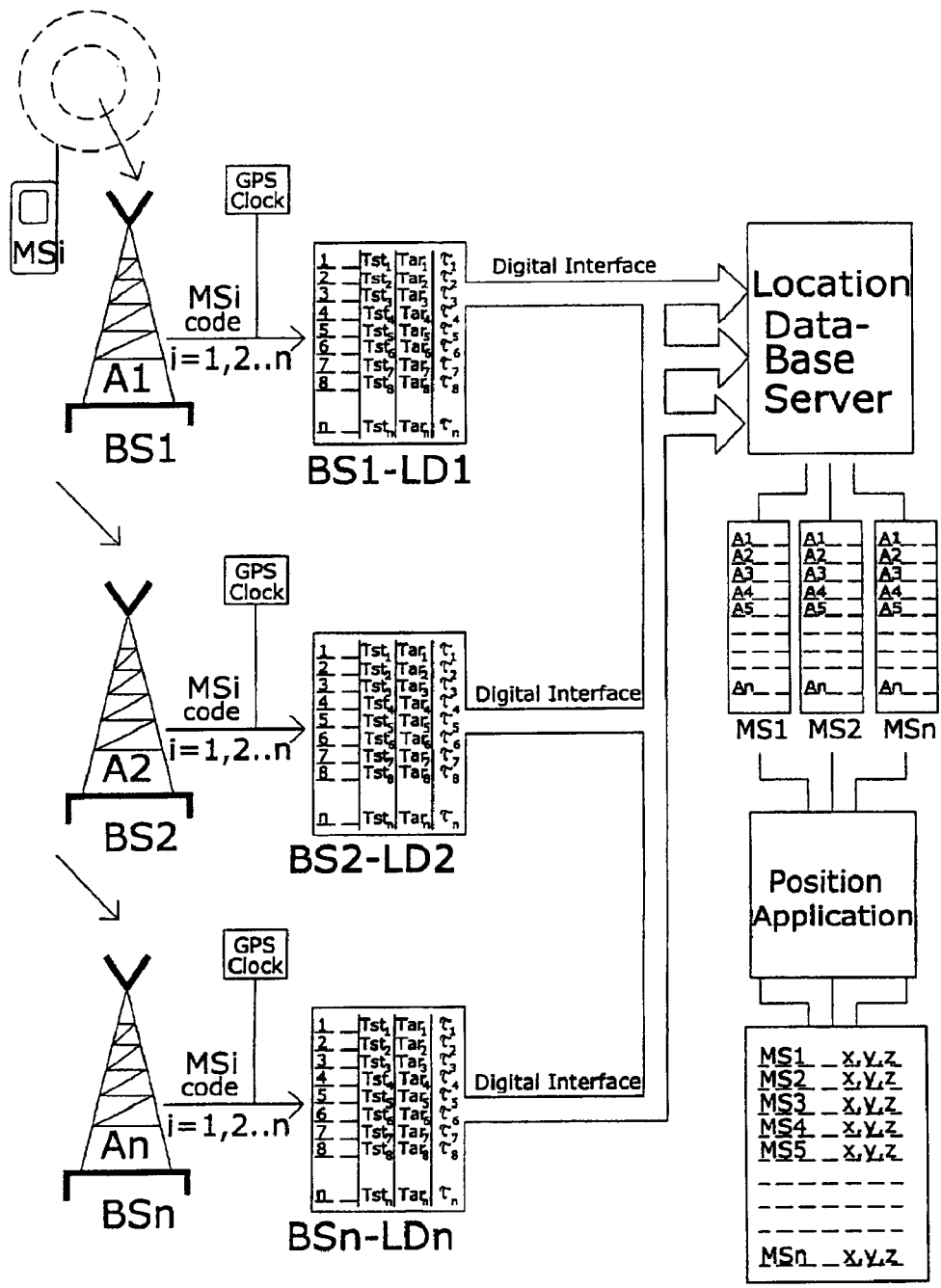
Fig. 1c Location Service Scheme

Fig. 2  Diagram of BTS Receiver with
Timing Block Device
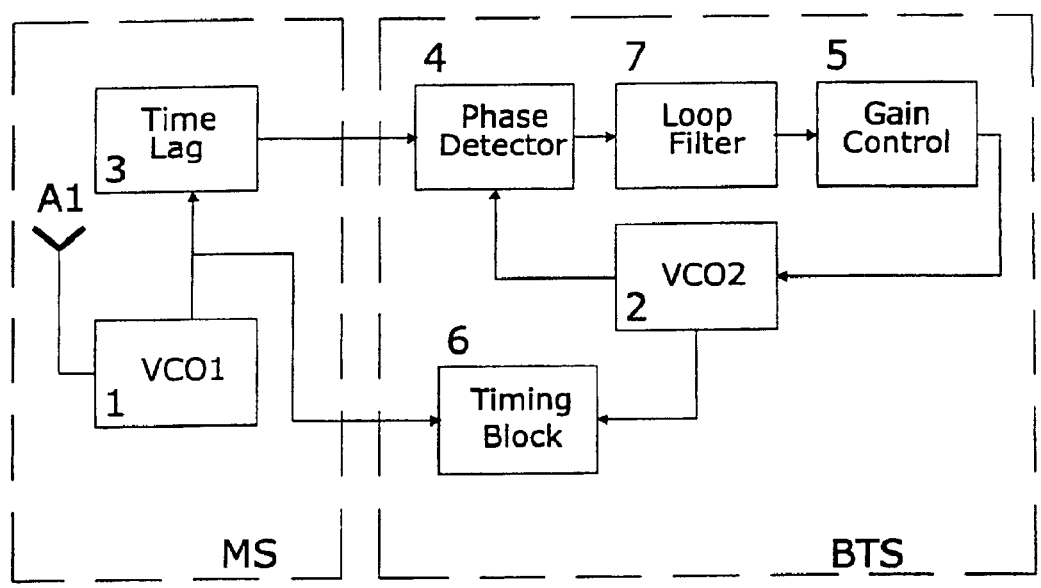

Fig. 3a & 3b Location Device and Antenna Configuration Scheme

Fig. 4a  Diagram of Location Device LD
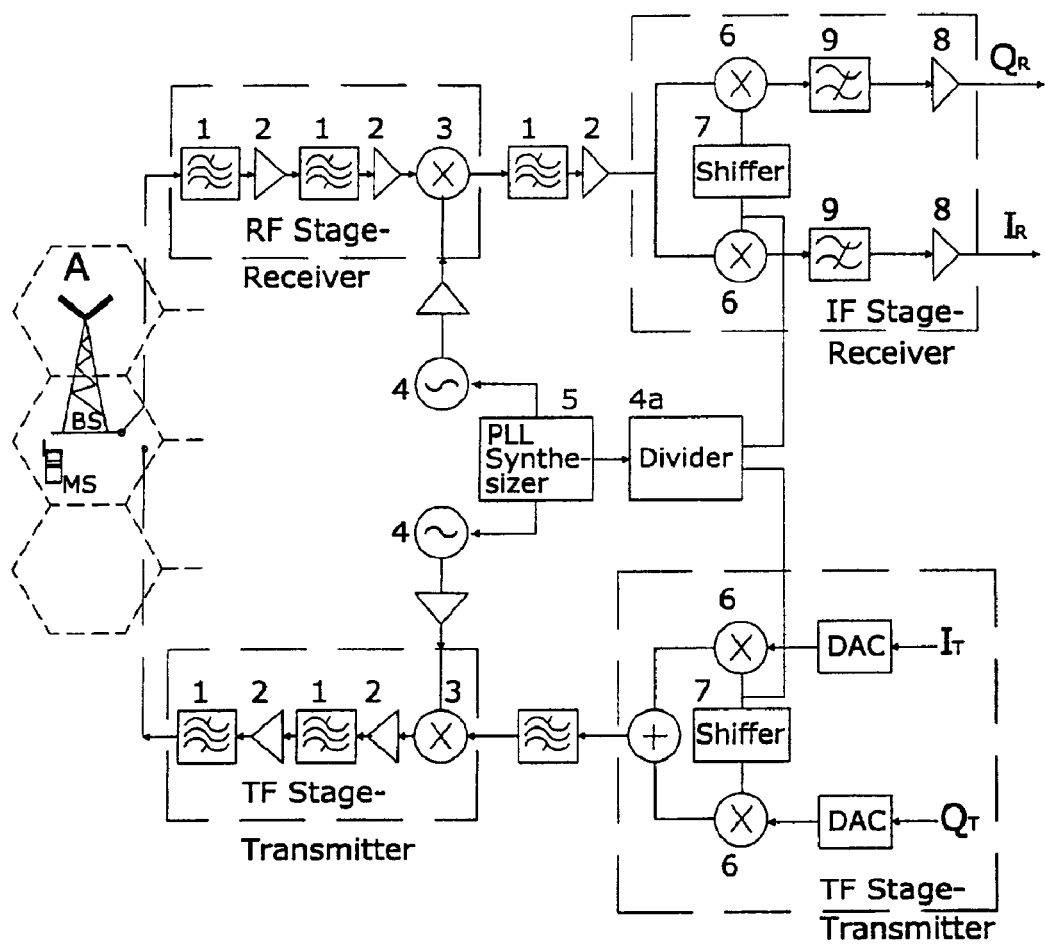

Fig. 4b   Diagram of Location Device LD continued
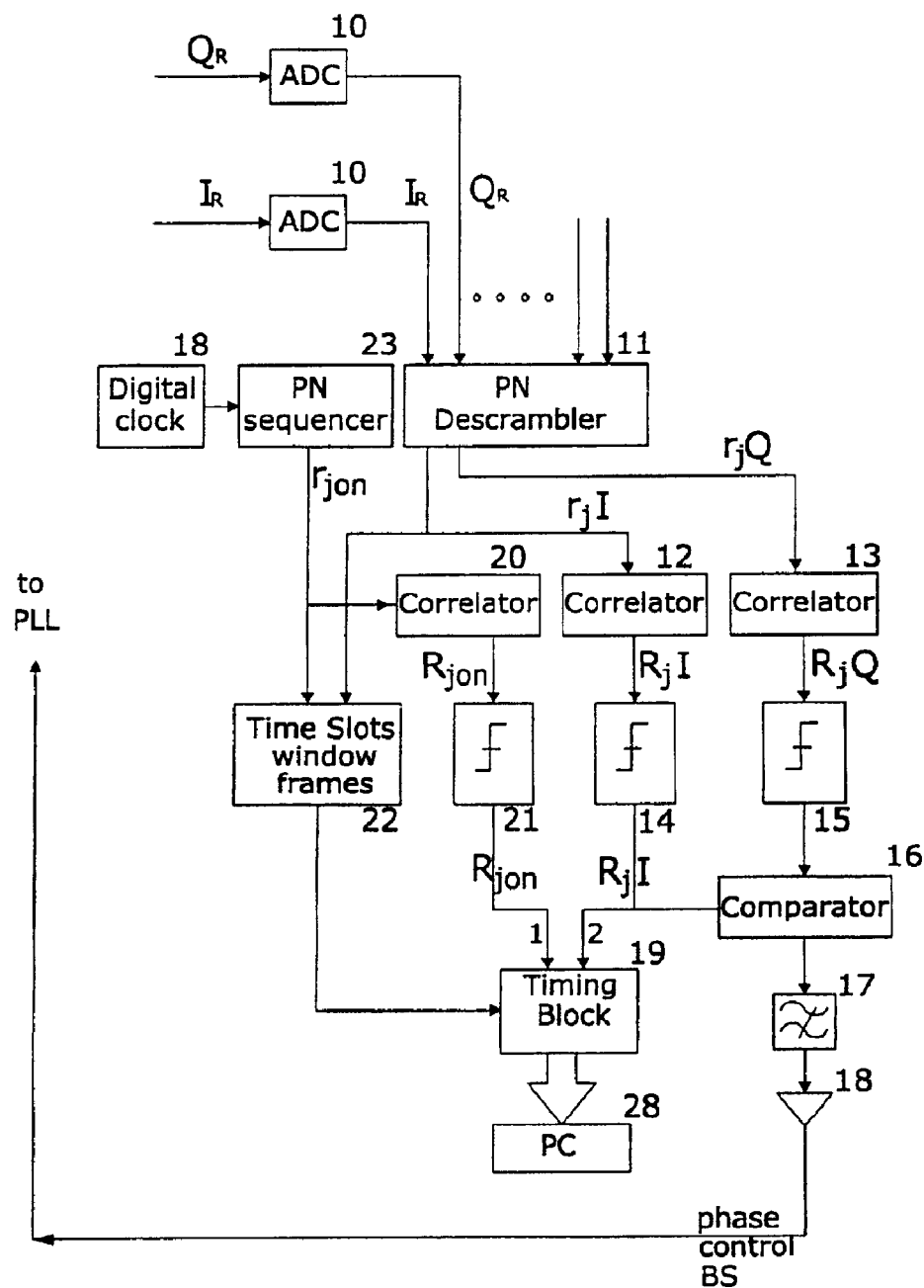

Fig. 5a  Diagram of Unit 19-
Timing Block in Fig.4b
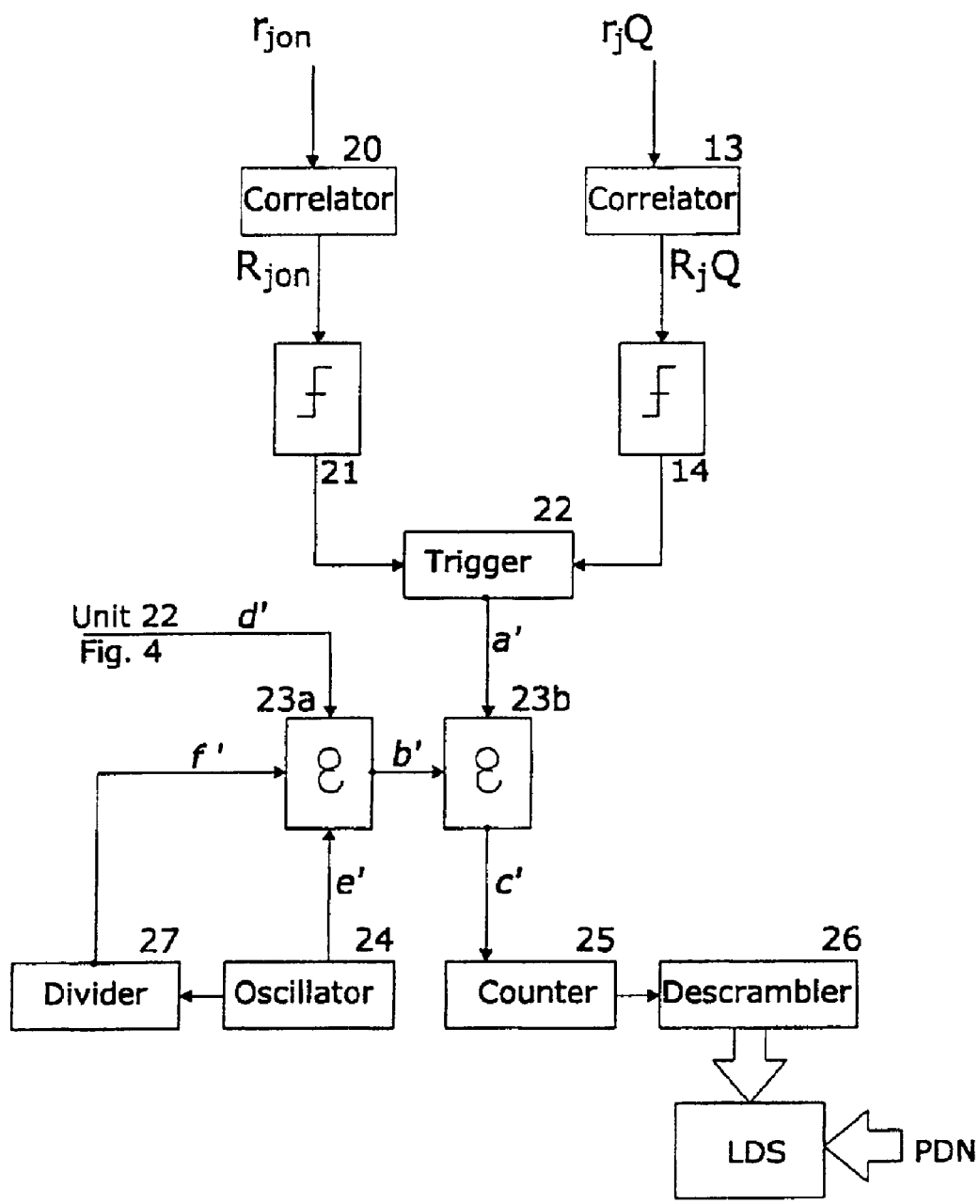

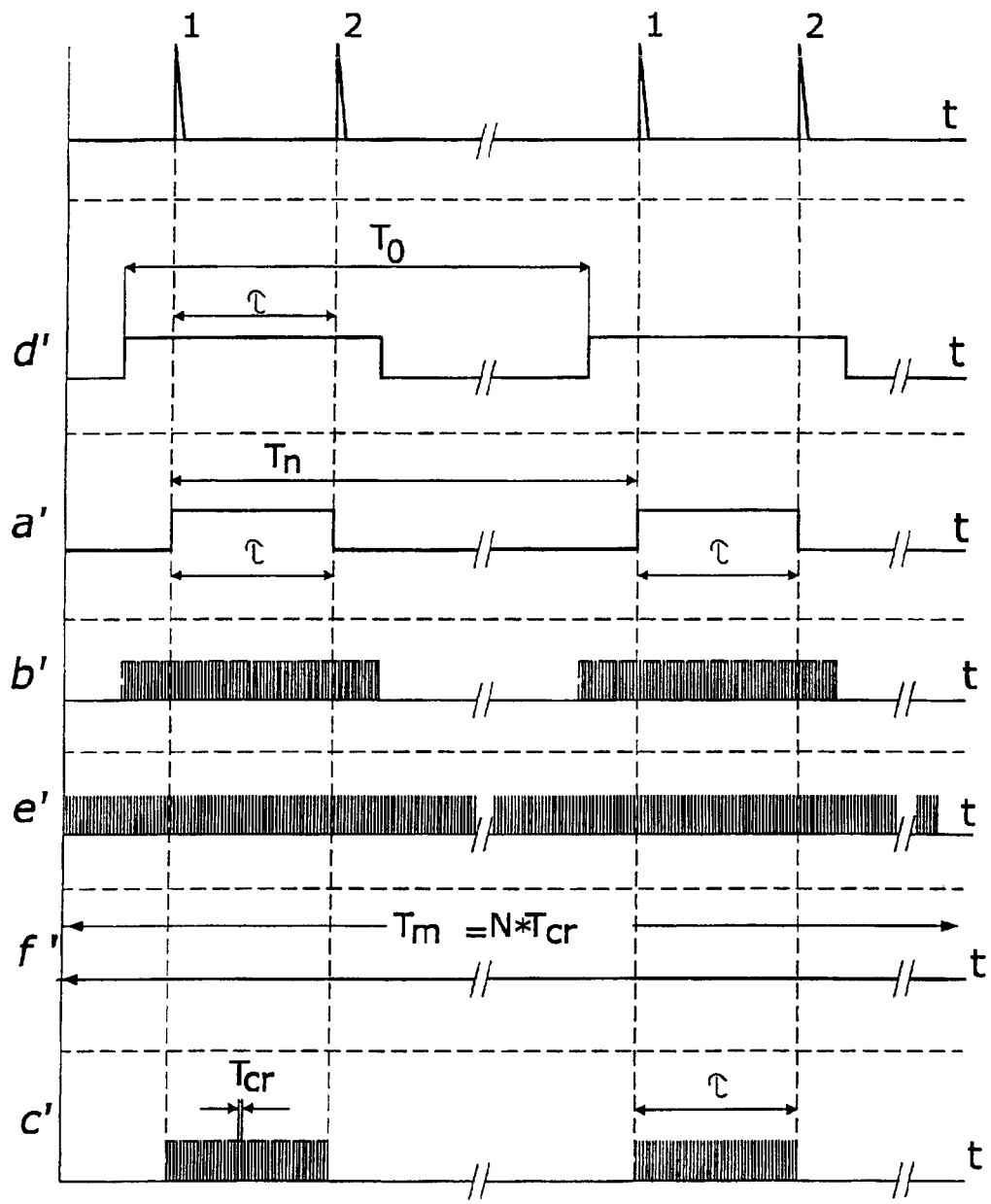
Fig. 5b Diagram of Signal Pulses

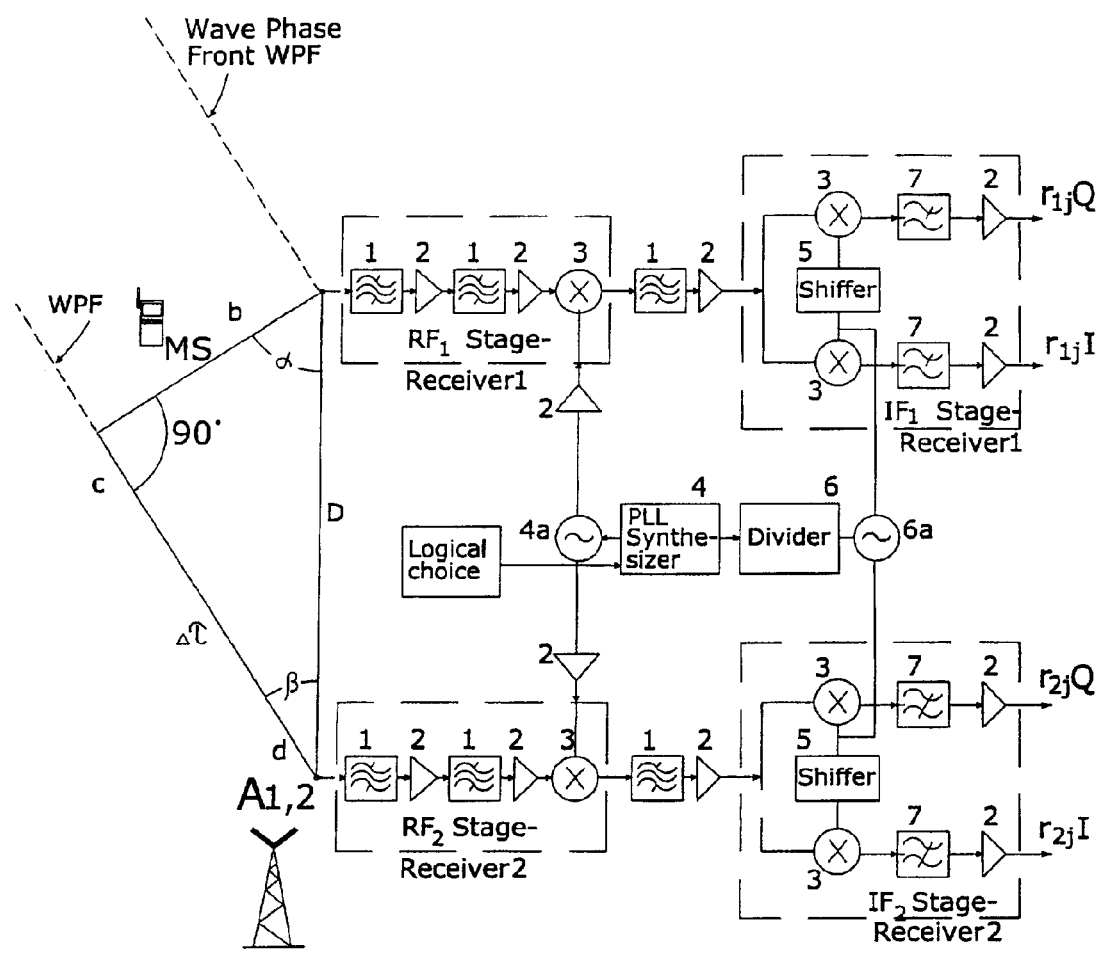
Fig. 6a Diagram of 2-Receiver Configuration

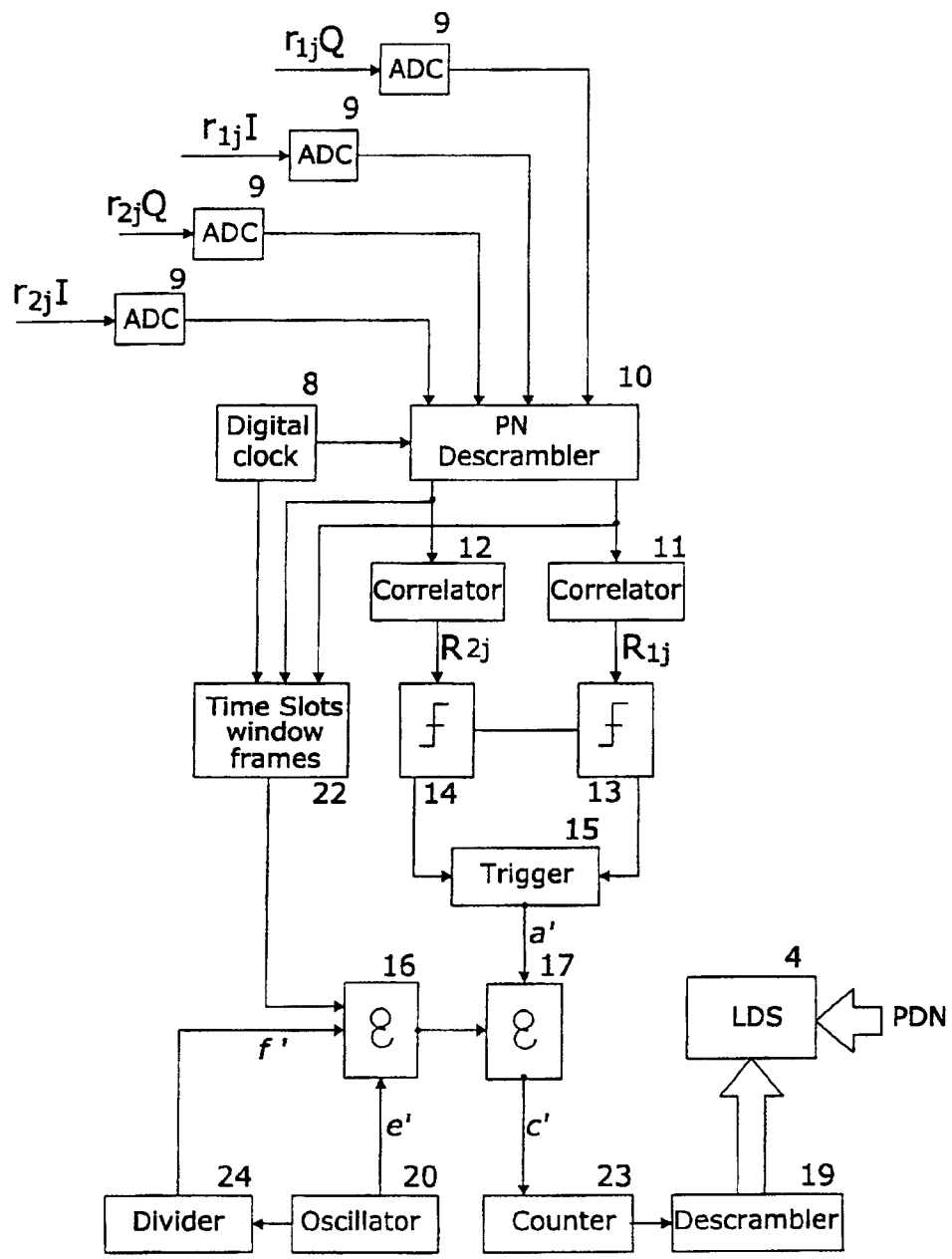
Fig. 6b Diagram of 2-Receiver Configuration continued

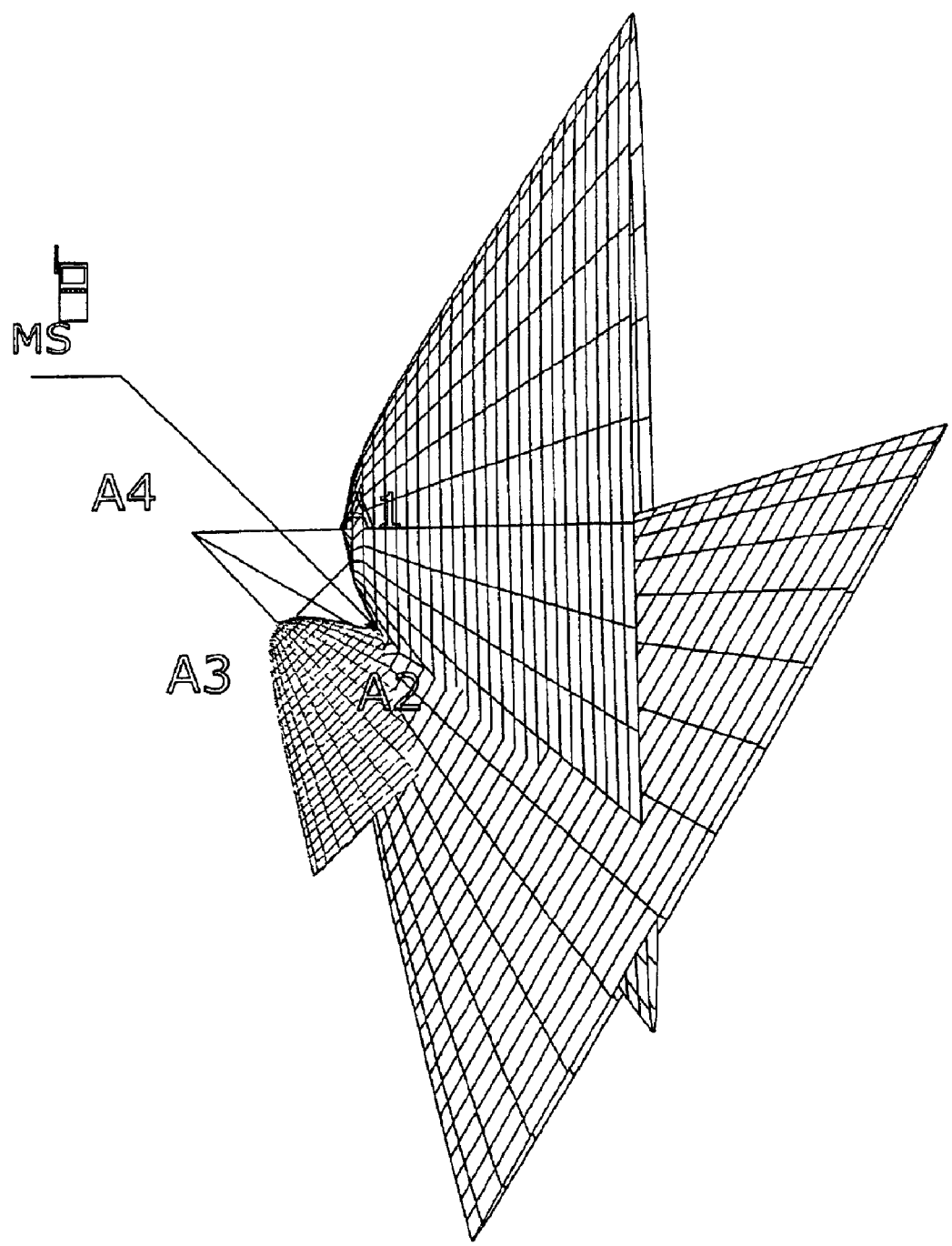
Fig. 7 TDOA 3-D Representation

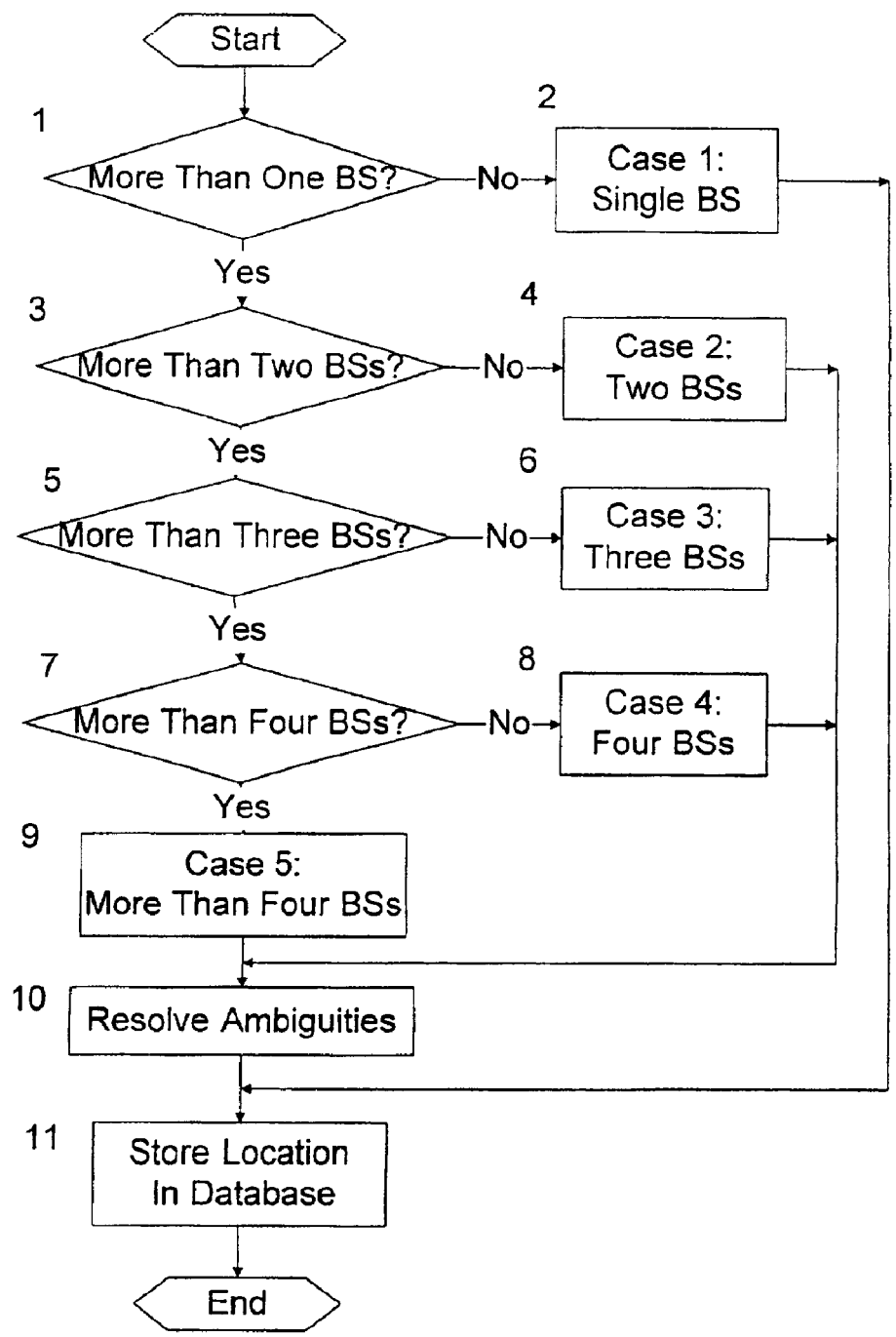

Fig. 9   Single Base Station
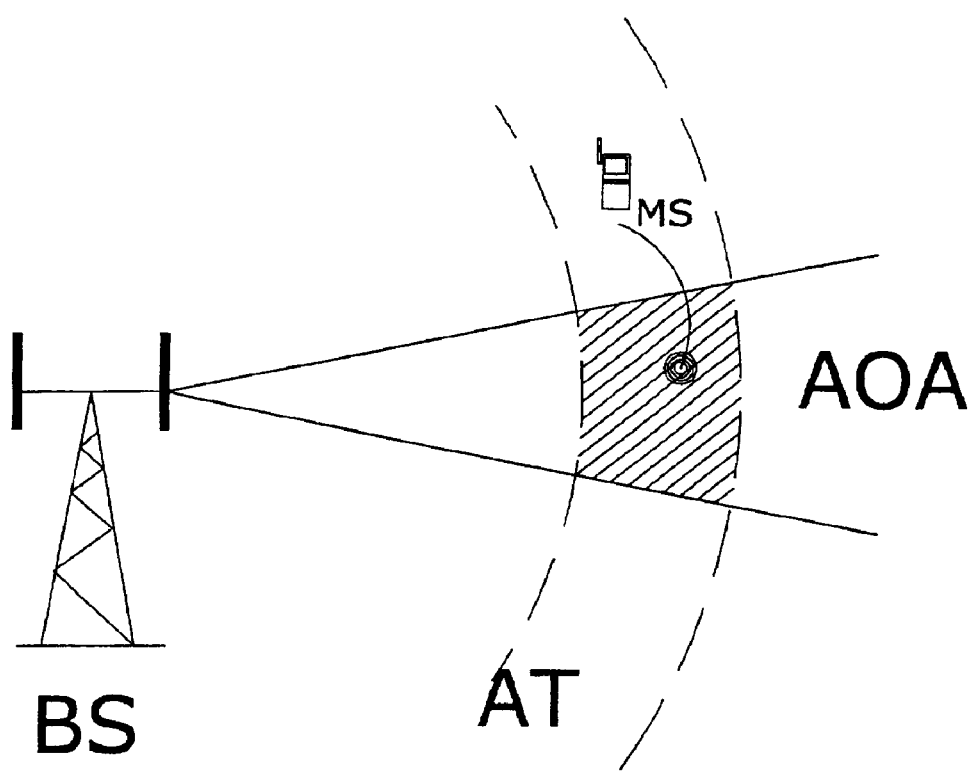

Fig. 10  Two Base Stations
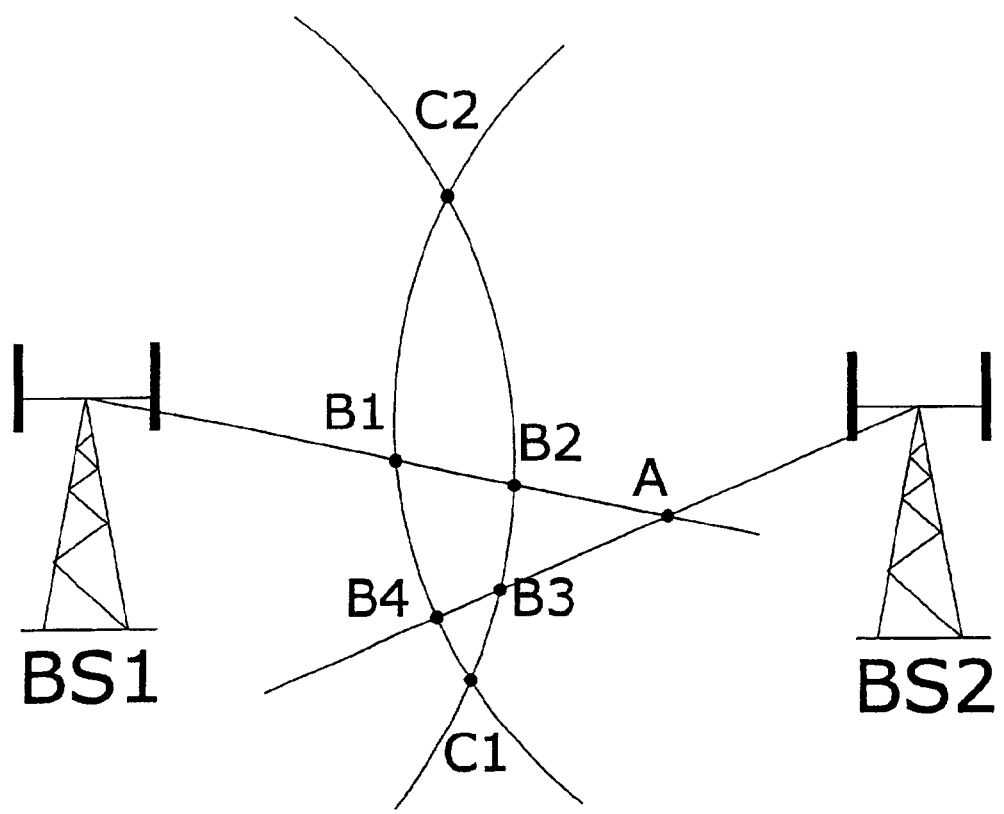

Fig. 11a  Three Base Stations: AOA Method
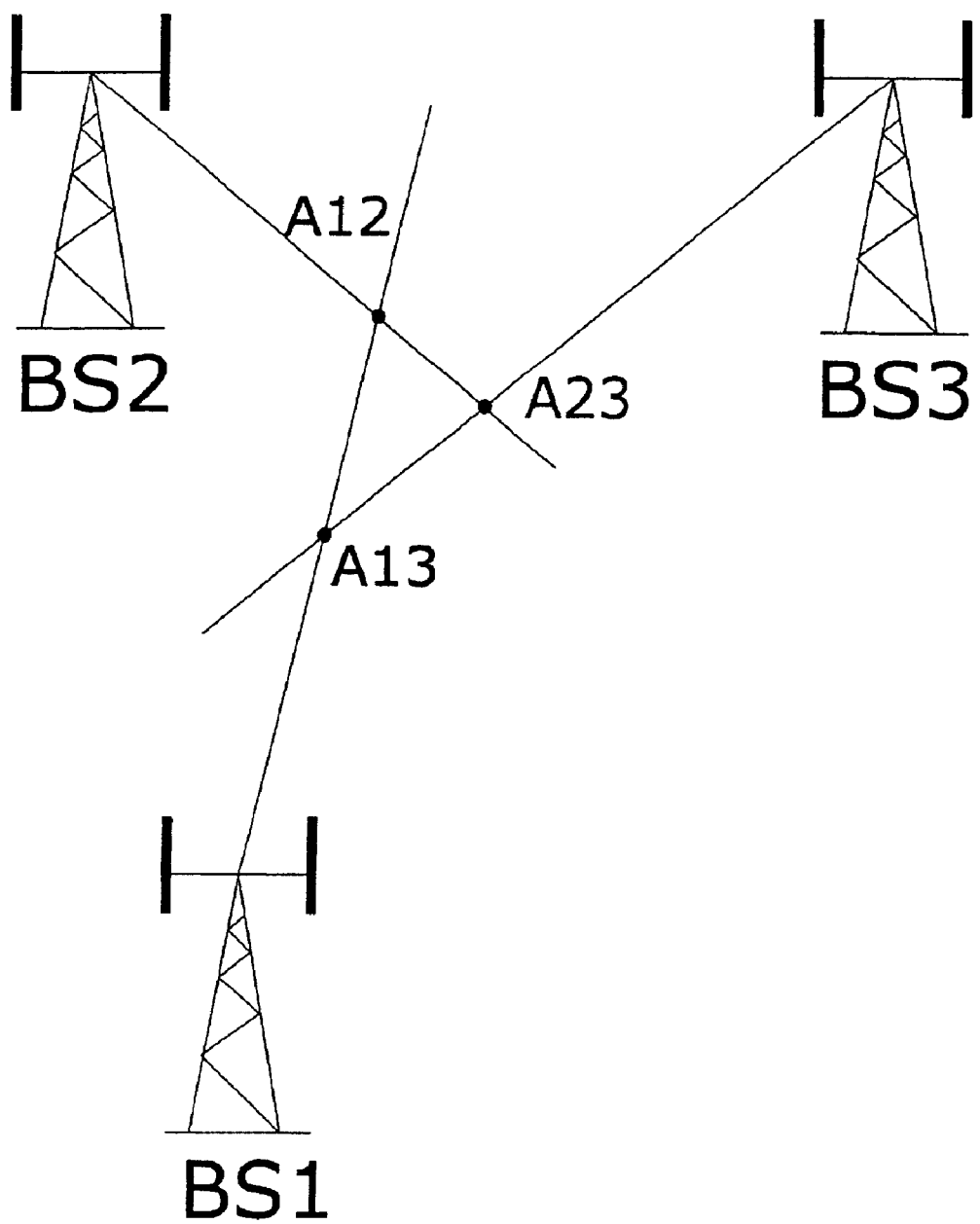

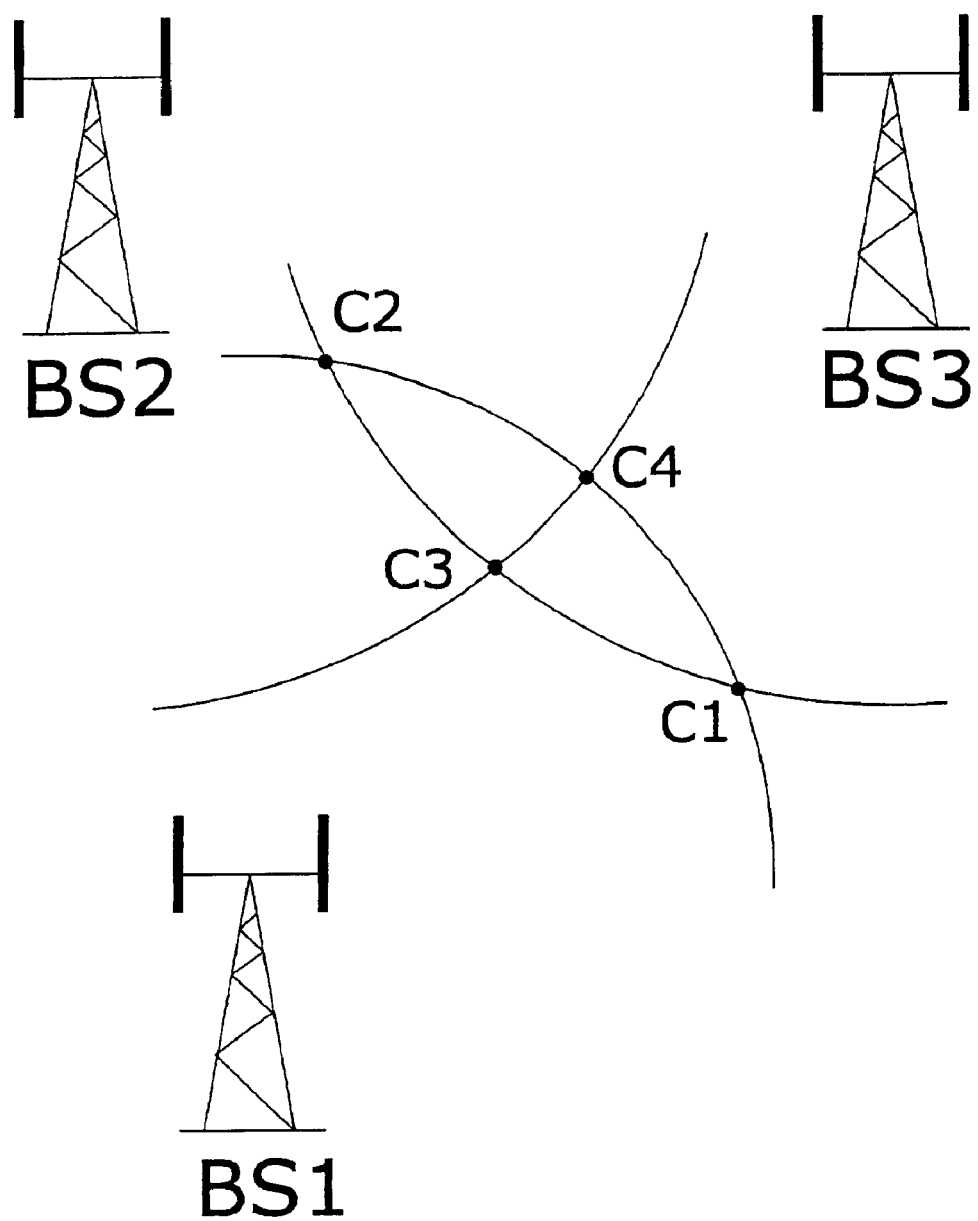
Fig. 11b Three Base Stations

Computations For Case of
Three Base Stations

Computations For Case of
Three Base Stations (cont.)

Fig. 13 Four Base Stations
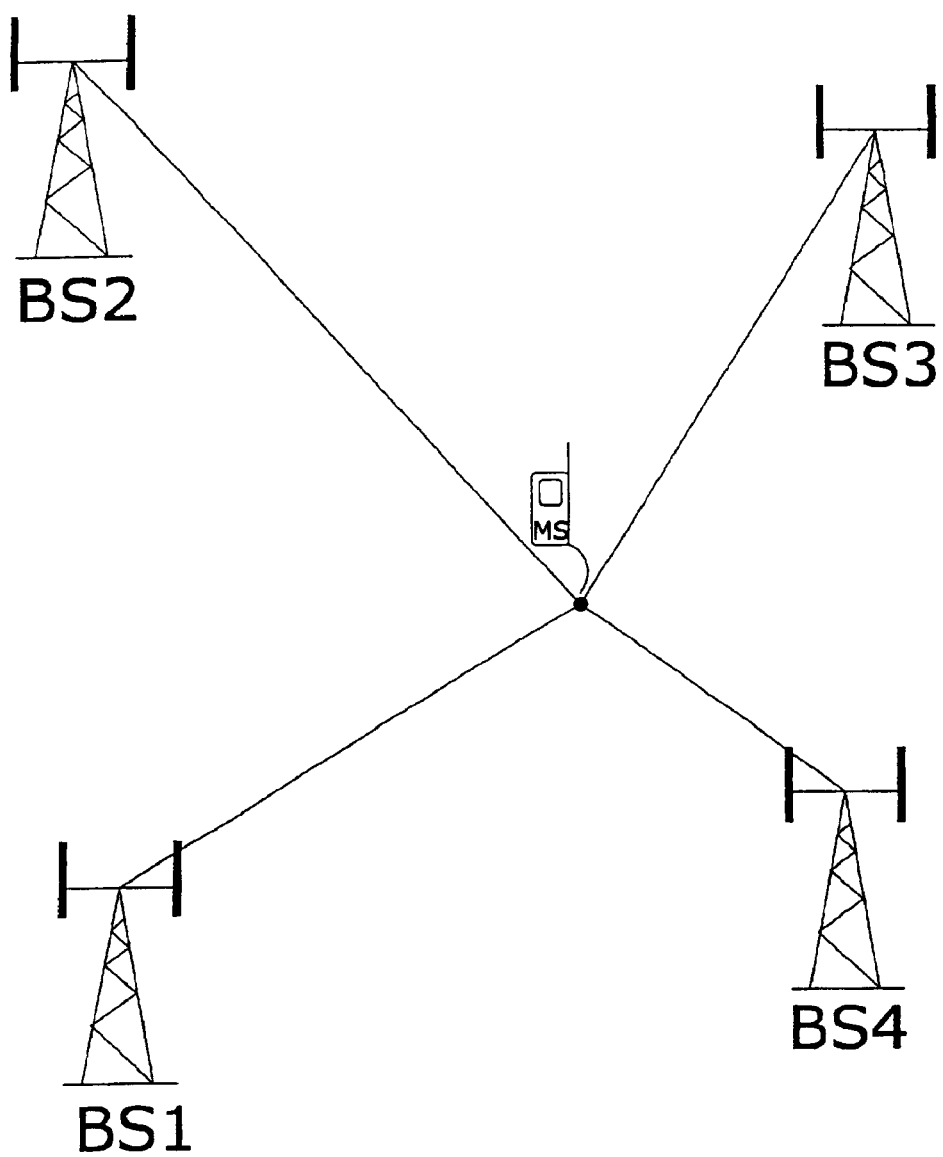

Computations for Case of
Four Base Stations

METHOD AND SYSTEM FOR MOBILE STATION POSITIONING IN CELLULAR COMMUNICATION NETWORKS

FIELD OF THE INVENTION

This invention relates to tracking, positioning and determining locations of plurality of mobile cell phones in wireless communication networks such as CDMA, TDMA, AMPs, etc. More specifically, the invention relates to MS location methods in cellular communication networks.

BACKGROUND AND OBJECTS OF PRESENT INVENTION

Cellular Networks in USA comprises of 18,000 cell sites (statistics based on years 1998–99). Cell coverage varies for various cellular systems and is overlapping. In many dense urban systems 7 to 8 cell sites cover a geographic point, in less dense areas 3 to 4 sites handle a call. The existing networks are therefore suited for our location systems, which must receive transmitted signal from multiple sites. FCC 911 Public Safety Answering Point PSAP requires 125 m and 65% accuracy AMPS Cellular Networks serviced 28 million cell phones in USA 1995 using AMPS standard "A" & "B" bands (416 channels, 30 kHz wide 21 channels for control purposes and 395 voice purposes). These systems use Reverse control channel—RACH for mobile phone locations (with transmission of 10 Kbytes/sec where minimum time of one transmission Tx=100 ms). RACH generally can support 2 to 3 transmissions per second. Reverse control channel RACH is also used for various other functions: MS registration, call origination and call reception. All RACH Messages are sent by conventional wire network to MTSO mobile switching office. CDMA and TDMA standard protocols conforming to AMPS are also widely used in USA with some differences. GSM standard protocol is generally used in Europe and will not be generally considered for the inventive system.

Existing Location Technology and Methods such as SigmaOne Location System, generally rely on the existing communication networks. Using independent system of data gathering equipment such as multiple Location units and specialized Location Network Controller which utilizes custom designed phase array antennas they attempt to provide positioning data with 150–250 meter accuracy.

These systems also use a number of known geometric methods to calculate mobile cell phone coordinates: signal attenuation, angle of arrival and time difference of arrival measurements. In the present embodiment several improvements for precise positioning are proposed.

RELEVANT PATENT CASES

U.S. Pat. No. 5,890,069, "Wireless location System". Proposes strategy for TOA locations of mobile phones. All base stations BS are synchronized by GPS-protocol (Global Positioning System). Super-Resolution (SR) mode measures time from all mobile MS to all base stations BS. Time is defined by compensations and by signal time delay at the input correlator, which is located after antenna array. Measurements are carried out in RECC mode (Reverse Control Channel) using 11-bits Barcker's code and 7-bits of signal sync code of frames. In this TOA method, mode delay line must consist of the general system-feedback synchronizing both BTS and MS. It should be noted that compensation methods are slower than direct methods of measurements and less accurate. Locations of client MS are result of compensation measurements. No software application is presented for processing the results of measurements.

U.S. Pat. No. 6,121,927, "Determination of Terminal Location in Radio System". This patent proposes to use a pilot signal for location mobile phones. Time of receipts of electromagnetic wave to antennas of three base stations BS is defined by the correlation processing of signals from array-antenna elements. In accepted standard levels, duration (time of correlations) is defined by mutual correlation functions. Direction and distance to MS is obtained by constructing 3 circle-intersection, which defines the area of most likely MS location. This patent is proposed for IS-95 CDMA (Code Division Multiple Access) standard systems. As is well known, generally TOA techniques are less accurate in MS location calculations and no TDOA calculations are proposed in this patent.

U.S. Pat. No. 6,070,079, "Positioning Apparatus Used in Cellular Communication System and Capable of Carrying out a Positioning with a High Accuracy in Urban Area". This patent proposes to define distance to the mobile phone MS on the energy spectrum bandwidth of signal in the output correlator, which is located together with array antenna. Distance and direction to MS is defined by the power-gain bandwidth. Spread-spectrum processing in the correlator is processed by a processor. Use of the Fourier processor limits speed and accuracy of measurement.

ADVANTAGES OF THE INVENTION

The present invention attempts to combine methods and tools from several fields such as Intelligent Traffic Systems, cell phone emergency location services and intelligent computational applications. ITS systems rely increasingly on smart signaling devices and sensors to determine and map traffic congestion patterns in real time.

By obtaining multiplicity of MS coordinates simultaneously in a large number of cell BSs, this invention provides real time data for tracking and mapping urban traffic congestion as proposed in U.S. patent application Ser. No. 09/528,134, "Real Time Vehicle Guidance and Forecasting System Under Traffic Jam Conditions" (Makor Co.).

Cellular networks location systems can provide additional capabilities besides existing sensor device systems, for obtaining moderately reliable position information and statistics for the Traffic Service Center databases in ITS systems. While many previous patents described methods for individual MSs location in real time, none has applied MS positioning techniques to ITS systems.

The present invention also attempts to improve accuracy of many proposed location devices. Using GPS-synchronized additional supporting location receivers in all monitoring BSs to calculate TDOA time difference delay and 'smart' antennas with high gain RF coverage.

A comprehensive approach to position ambiguity will be used to significantly reduce position errors. The stand-by tracking position data will then be used on geographical road maps as a basis for continuous positioning.

Algorithmic methods include Attenuation, AOA and TDOA methods.

BRIEF DESCRIPTION OF THE INVENTION

The preferred embodiments of the invention deal with all relevant functions of System of Cell Phone Positioning in real time with specialized Location Device installations on multiplicity of base stations BSs in CDMA an TDMA cellular communication networks. The purposed of the positioning system is to locate a large quantity of anonymous mobile cell phones MS in any number of network cells to be used for real time traffic-forecasting systems, emergency services such as E911, and other client-initiated position requests. The system is capable of covering large urban geografical areas and number of independent cell structures serving thousands of mobile cell phone clients. It is an independent turnkey solution with specialized synchronized Location Device installations in each cell BS with a centrally located specialized triangulation software based on Angle of Arrival (AOA), Time of Arrival (TOA), and Time Difference of Arrival (TDOA) methods for high speed location processing. The inventive system consists of number of component functions: Operator-initiated functions, Location Device functions and software-controlled mathematical functions.

Combination of location determining techniques AOA, TOA and TDOA will be used for optimal location strategy. As the accuracy of array-antenna based direction determining AOA and TOA systems decreases over the relative distance between base stations BS and mobile source MS the TDOA hyperbolic/hyperboloid techniques complement and improve the overall location performance. The TDOA location technique involves use of time delays of MS source signal between several base stations BSs synchronized receivers in CDMA standard. Results are calculated from a set of nonlinear equations and specialized algorithms are utilized to solve problems of ambiguity. Two approaches are generally used in TDOA: subtracting TOA measurements from two BSs to produce relative TDOA, or using cross-correlation techniques where received signal at one BS is correlated with the same signal at another BS.

Transmission timing is done with Global Positioning System GPS clock and full system synchronization is required between base stations BSs and MS. In IS-95 CDMA standard full synchronization is available for relative and cross-correlation TDOA techniques.

According to the present invention, a Location Device (LD) located in each BS will be used for signal correlation purposes as shown in FIG. 1a and FIG. 1b. It is based on the TDOA signal cross-correlation techniques and will complement existing BS standard IS-95 CDMA equipment.

The LD's main purpose is to create a Timing Block (7) mechanism to efficiently correlate and quantify the arriving source signal from two BS antennas A1 and A2. Two variations of Timing block mechanism are proposed here: 1. LD consists of additional receiver (6a) from supporting communication channel in antenna A2, specialized CDMA correlator (6) (see FIG. 1a) for compression of signal and special time interval counter for time delays in time block (7) in the time accumulation and time interrupt mode. Resulting digital data is then transmitted via digital interface to LDS database (4) for MS location calculations. The LD is fully synchronized with the BS receiver (1) antenna A1 by the system GPS clock (5), PLL Synthesizer and Digital Clock (3) for digital signal processing. Group time of delay is measured by Timing Block (7) resulting from propagation delay due to spreading a from the MS transmitter (8) to the receiver (1). Time interval is measured between the supporting signal from A2 synchronized in the PLL frequency synthesizer (3) formed by the correlator (6) and by the receiver (1). Timing Block LD (7) measures sections of signal windows frames of time intervals in CDMA to improve measurement accuracy. Time difference measurements of the signal delays come from two antennas A1 and A2 and the time delay is measured between the signal from the receiver 1 and signal from the correlator 6 in the additional supporting communication channel.

2. For the simple time of arrival TOA technique a variation of Timing Block (7) is proposed in FIG. 1a. A single existing Antenna A1 in BS receives mobile source signal and measures time delay between MS antenna A3. In this variation all BSs will be synchronized in the network system clock such as exist in CDMA standard. Absolute time difference measurements of MS signal are compared and calculated from two different BSs. Time difference data for distance calculations are then stored in the central LDS Location Register database.

The present invention proposes to use wireless 3D hyperbolic trilateral location method for determining cell phone position and filtering out possible position ambiguities. Conventional radiolocation systems locate a MS by measuring propagation times of the signals traveling between the MS and a fixed set of BSs. There are three major types of radiolocation systems: those based on signal strength, or attenuation methods (AT), those based on angle of arrival (AOA), and those measuring time of arrival (TOA or TDOA). After direction of paths to/from a MS from/to multiple BSs have been determined, geometrical relationships are used to determine the location. Each of the lines of position, i.e., the curves that describe the possible location of the MS, can be described mathematically using the relative geometry of the BSs and MS, while intersection of those lines indicates the presumed location of the MS. Locations of cell phones can be determined in the same way. However, to achieve good accuracy in location estimates, it is necessary that line of sight paths exist between the MS and the BSs that are utilized in the location process. This cannot always be assumed in real situations, especially in urban areas where ambiguities arising from multiple crossings (multipath) are common. Therefore, various combinations of the above mentioned methods will be used for exhaustive utilization the existing data on the one hand, and for filtering out possible false locations on the other. The general scheme of computations is shown in FIG. 7 and further details are given in the Detailed Description below.

The Cellular Network Operator-initiated Functions:
1. Cellular network operator initiates a sequence of silent Positioning Request Signals (PRS) via BS control channel to mobile cellular phones MS's from the serving pilot BS according to some predetermined order by mathematical algorithms. Since it is essential to obtain a large number of MS position signals, the operator must deal with existing communication traffic constraints and the need for providing continuous tracking of MS data.
2. Mobile cellular phone MS responds to position signal PRS only if the MS is currently in stand-by (idle) mode in RACCH protocol. The operator can also obtain positioning data when MS is engaged however in this discription we will concentrate on stand-by mode MS responses only.
3. Location Device modules installed on serving BSs process silent positioning response signals to co-located for Timing Block Time-Start/Stop Stamping,TOA signal delays: $\tau_1, \tau_2, \ldots, \tau_n$, or TDOA $\Delta\tau$ for each MS.
4. Operator maintains synchronization of cell base station antennas via GPS system clock and in additional Location Device Antennas
5. Receiving MS PRS signals from multiplicity of cell base stations equipped with LD modules 6. Forwarding, from said multiplicity cell base stations, TOA and TDOA data and timing information to central Location Database Server (LDS). Transmitting location data to interested cellular network clients The Location Device Module Functions:
1. Receiving succeeding MS Positioning response signal PRS
2. Identifying and Decoding incoming PRS signal
3. Performing signal identification code (ID) and Time Stamp functions
4. Storing PRS signal delays $\Delta\tau$ in temporary LD memory
5. Transmitting packets of collected PRS data from each BS to LDS in forwarding module via digital interface.

Location Database Server Functions:
1. Calculating TDOA location for each MS data from multiplicity of BS and based on applied weighted algorithm for 3–5 BS Location Device antennas
2. Applying attenuation methods, and angle of arrival methods to signals from two BS LD antennas
3. Optimizing and reducing position ambiguities in case of two or more available solutions or ambiguious results

BRIEF DESCRIPTION OF THE DRAWINGS

FIG. 1a: Diagram of Location Device Scheme 1 with additional supporting antenna A2 describing Timing Block that is based on the TDOA measurements in two reception channels in a single BS.

FIG. 1b: Diagram of Location Device Scheme 2 with single existing BS antenna A2 describing Timing Block that is based on the TOA method in two reception channels in two base stations.

FIG. 1c: Diagram of Location Service Scheme with Location Devices located on each BS. Each LD is synchronized by GPS clock if necessary, processing MSi code signal and calculating TOA and TDOA signal delays: $\tau$ or $\Delta\tau$ for each MS to be passed to Location Database Server via digital interface for MS positioning.

FIG. 2: Diagram of BS receiver with Timing Block device which describes the time delay phase detector (4) with VC02 oscillator and timing block LD (6) for phase synchronizing systems from MS VC01 oscillator to compensate for the signal phase delay (Time Lag) (3) due to the signal propagation $\tau$.

FIG. 4a: Partial Diagram of Location Device with a RF receiver (2) and IF receiver (3) located in base station BS1 for sequential input to Timing Block Processor for TOA calculations.

FIG. 4b: Continuation of FIG. 4a

FIG. 5a: A Partial Diagram for the Timing Block Processor for time difference measurements TDOA.

FIG. 5b: Diagram describing signal window frames of several incoming signals explaining the principles of measurements of time intervals $\tau$ in the Timing Block Processor.

FIG. 6a: A Partial Diagram of Location Device with a RF receiver (1), antennas A1 and supporting RF receiver (2) and supporting antenna A1,1 located in base station BS1 for input to sequence correlators and Timing Block Processor for TDOA calculations in this two-antenna configuration.

FIG. 6b: Diagram of 2-Receiver Configuration continued

FIG. 7: TDOA 3-D Representation

FIG. 8: Wireless 3D Hyperbolic Trilateral Location Method

FIG. 9: Single Base Station

FIG. 10: Two Base Stations

FIG. 11a: Three Base Stations: AOA Method

FIG. 11b: Three Base Stations: AT Method

FIG. 13: Four Base Stations

DETAILED DESCRIPTION OF THE INVENTION

Figure 3A:
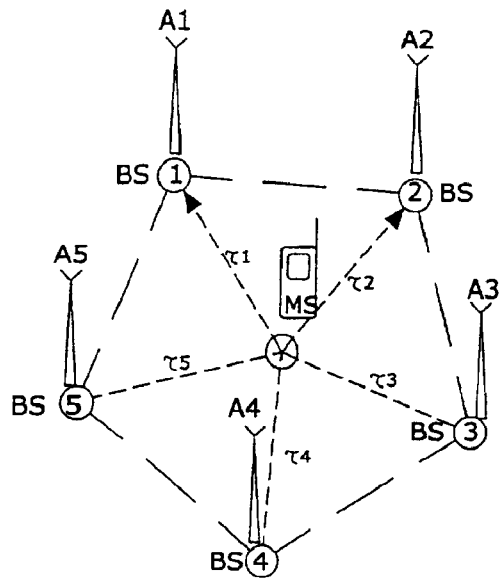
FIG. 3a: Diagram of BS antenna configuration for location of MS in real time using TOA method. Each BS1 . . . BS5 is synchronized by system clock and receives MS signal with propagation $\tau_1, \tau_2, \ldots, \tau_5$ absolute time delay.

In IS-95 CDMA cellular network, each base station BS is synchronized to CDMA system time, which is derived from a precise time reference supplied by GPS satellites. All base stations in CDMA network use the same frequency channel, or carrier. Spreading codes are used to separate all signals in order to assure smooth channelization of both access and traffic communication channels, provide a level of privacy and preventing simple signal despreading. Active BS transmits pilot signal to MS on the downlink using the same Pseudo-Noise (PN) sequence; however, each pilot is offset in time from the others, allowing the subscriber to differentiate the signals. Each pilot PN sequence repeats every 26.67 ms (at chip rate 1.2288 Mchips/sec). Each BS pilot is transmitted with offset of 64×n-chips (52.08 $\mu$s), from other sequences. Every subscriber communicating with the BS uses the same spreading code and offset (except for propagation delays as will be described later) so that the long code is used to identify both access and traffic channels. A subscriber unit's (MS) time reference is offset from CDMA system time by the propagation time delays between base station BS and the mobile subscriber's phone MS. These propagation delays create time and phase shifts in the system both in BS-transmitter and MS-receiver oscillators.

The Cellular Network Operator-Initiated Functions

The Mobile Switching Center MSC is the heart of the wireless infrastructure network. Every circuit from a mobile handset MS is served by BS, which then homes into MSC via the Base Station Controller BSC. The MSC routes the calls to the PSTN, another MSC, an Internet Service Provider (ISP) or a private network such as Location Service LS, for connection to the appropriate destination. To ensure service communications such as LS via traffic management, the wireless network uses BSC controllers to segment the network and control congestion. The result is that MSCs route their circuits to BSCs, which in turn are responsible for connectivity and routing of calls for 50 to 100 wireless base stations BSs. In the present system, the MSC initiates a sequence of silent Positioning Request Signal (PRS) broadcasts with appropriate lists of BSs, and MSs approximately every 2 seconds via BSC control channel to all BSs. The BSs in turn to route the PRS broadcasts to all available mobile MSs within that specific mobile cell. The silent Positioning Request Signal (PRS) contain typically each MS code and ID, last recorded cell position in HLR and VLR registers for speedy distribution. Since it is essential to obtain a large number of MS position signals, the operator must deal with existing communication traffic constraints and the need for providing continuous tracking of MS data.

The MS responds to position signal PRS only if the MS is currently in stand-by (idle) mode. The position service transaction uses reverse control RACCH channel with overall time estimate of about 40 ms for each request/response transaction. (The operator can also obtain positioning data when MS is engaged, however we will concentrate on stand-by mode MS responses only.) Assuming, that about 1000 channels are available at each given BS at any moment the LS capacity can be said to be about 50 MS/channel/sec. or about 2000 to 2500 MSs per second.

The Location Device modules LDs, described later in FIGS. 1a and 1b, which are installed on each BS process PRS responses in co-located for Timing Block Time-Start/Stop Stamping, TOA signal delays: $\tau_1, \tau_2, \ldots, \tau_n$, or TDOA $\Delta\tau$ for each MS (FIG. 1c).

From said multiplicity of cell base stations, TOA and TDOA data and timing information are then returned to MSC central Location Database Server (LDS) via digital interface. As mentioned before, the PRS positioning broadcast is made periodically say every two seconds in order to provide continuous anonymous tracking of all available MSs. In the interest of protecting privacy of individual MS a unique code cover will be provided for each MS and the real time tracking data used for statistical purposes only. Only individual clients interested in specialized tracking and positioning services may order so from the service operator after appropriate measures were taken.

The cellular and PCS/DCs wireless service providers must fully control their own timing references and clocks at MSC locations using reliable and accurate clocking system that receives timing input directly from GPS. In order to assure accurate data at each LD module the LD uses the system synchronization pulse for LD timing.

FIG. 1c shows a diagram of Location Service Scheme with Location Devices located on each BS. Each LD shows synchronization by GPS clock, processing of individual MSi code signal and calculating TOA signal delays $\tau$ when using single antenna configuration shown in FIG. 3b. As will be shown later, the TOA data from absolute signal time delays are generally less reliable for accurate measurements.

Figure 3B:
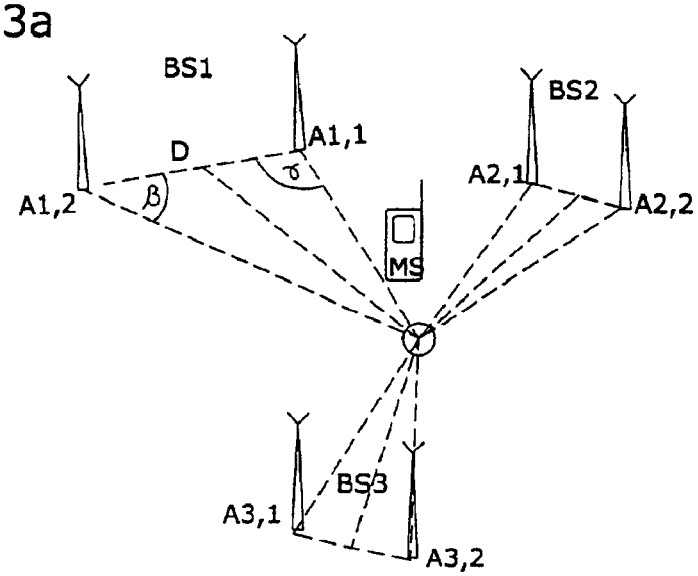
FIG. 3b: Diagram of BS antennas A1 . . . A3 configuration with additional supporting antennas A1,1 . . . A3,3 for location of MS using TDOA and AOA methods showing 3 base stations and their antenna arrangement.

In the preferred embodiment the LD will process TDOA signal time delay differences on two antennas A1,1 and A1,2 shown in FIG. 3a. All signal data from each BS will be sent to Location Database Server via digital interface for MS positioning.

FIG. 1a shows a partial diagram of Location Device Scheme 1 with additional supporting antenna A2 describing Timing Block. This configuration is based on the TDOA method for two-reception channels in single BS. When only single existing BS antenna A2 is available, FIG. 1b: Diagram of Location Device Scheme 2 will apply. The Timing Block here is based on the principle of absolute time of arrival TOA difference measurements in two reception channels in two separate base stations.

FIG. 2 shows a diagram of phase synchronization between the MS Antenna A1 and the BS heterodyne receiver. This system comprises mobile station MS with its local oscillator $VCO_1$ that is synchronized with the base station BS receiver's: $VCO_2$ oscillator (2) by means of automatic control device. This device contains phase detector (4), loop filter (7), and gain control (5). Group signal delays result from MS signal propagation $\tau$ and are calculated in Time Lag (3). The processes occurring in the phase-synchronizing system can be expressed by the differential equation:

$$d\phi/dt+\Omega_y*K(p)*F(\phi)=\Omega_1 \quad (1)$$

where $\Omega_1$ is the initial frequency difference on $VCO_1$ and $VCO_2$, K(p) is the coefficient of filter transfer (7), $\Omega_y$ the mutual de-tuning, $F(\phi)$ the phase detector characteristics (4) (FIG. 2). In the stationary mode under K(p)=1 we obtain from equation (1):

$$F(\phi)=\Omega_1/\Omega_y\pm 2\pi k \quad (2)$$

where $\phi=\phi_1-\phi_2$, $\Omega_1$ depends on the time delay between $VCO_1$ and $VCO_2$ oscillators, i.e., on the value $\Delta\phi=\omega_0\tau$, where $\omega_0=2\pi/T_0$ the oscillator frequency. It is possible to measure phase shift (time interval $\tau$) with a phasemeter in case of $\tau/T_0<1$. If $\tau/T_0>1$, it is necessary to use a measuring time device i.e., Timing Block (6), see FIG. 2.

The group time delay $\tau$ of a signal from MS to BS depends on the distance $d=c\tau$ of MS from BS, where $c=3*10^8$ m/sec is the speed of light and is measured in Timing Block (6).

FIG. 4a shows a partial Diagram of Location Device with a RF Stage receiver and IF Stage receiver located in BS for communication link with a single MS unit.

Upon the arrival of MS signal to BS antenna A at high frequency RF Stage Receiver, the signal is transformed to intermediate frequency IF. The circuit contains: RF baseband Filters (1) amplifiers (2) mixers (3) synchronized with the frequency of carrier signal in heterodyne (4) in the PLL frequency synthesizer (5) controlled by operator's dedicated logical choice code. Synchronized signal conversion is de-modulated in demodulator of IF Stage Receiver. Demodulator contains Mixers (6), Shiffers (7), amplifiers (8) filters of low frequency Filters (9); analog to digital converters (10), frequency divider (4a) in second heterodyne of receiver.

In digital circuits of BS receiver signals go from ADC (10) and enter the decoder of digital M-sequences PN sequencer (23) of PN Descrambler (11), which provides selection of sequences with code attributes of MS window frames in CDMA.

Continuing from PN descrambler (11), digital sequences $r_jI$ and $r_jQ$ from MS signals are passed to correlators (12) and (13) respectively via threshold device (14) and (15), to Correlators (12, 13) and on to Comparator (16). The signal is then returned from lower frequency filter (17), amplifier (18) in phase-controlled channel to the PLL synthesizer (5). Digital clock synchronizes base M-sequences for given MS. $R_{j0}$ enters the additional correlator (20) through the decoder (PN Sequence). Output signals from correlators (12) and (20) are limited by threshold devices (14), (21) responsible for the formation of short-pulses and are entered to the time block (19).

Timing block scheme and signal pulse shapes are shown in FIG. 5a and FIG. 5b respectively.

FIG. 5b shows Pulses 1 and 2 arriving from thresholds devices (14) and (21) as seen in FIG. 5a and enter into trigger flip-flop (22) where samples of square-wave pulses shown in FIG. 5b are produced. Signal duration $\tau$ of is proportional to the time delay which appears due to propagation delay on route from MS to BS.

Square-wave pulses a' from flip-flop trigger (22) enter into first input logic-multiplier device (23b) and feed pulse packs into second logical re-multiplier device (23b).

An output signal b' from device (23a) in FIG. 5b is formed as a result of multiplying short-pulses from the oscillator (24), pulses determining measurement time $T_m$ from frequency divider (27) f' and pulses of overlapping windows of signal frames d' (FIG. 5b).

Short-pulse packs in are formed on the multiplier-logic device (23b) and are fed to the counter (25). The overall number of pulses received in the counter (25) depend on amounts of packs P in one cycle of measurement process $T_m=N*T_{cr}$ where N is the frequency division factor, $T_{cr}=1/f_2$ is the period of repetitions of pulses from the oscillator (24). The measurements of interval timeslot window-frames (FIG. 5b) are in the form of packs of counter pulses c' (FIG. 5b). The number of pulses in the counter for one time interval is $t=\tau/T_{cr}$. The total amount of pulses in the counter equals $C=(\tau/T_{cr})*P$. The duration of measurement cycle is chosen from the condition $T_m \geq P*T_0$ where $T_0$ is the interval of repetitions of idle frames FIG. 5b. Under an appropriate choice of values of $T_{cr}$, N, P, the number in the counter (25) will be proportional to time. In general, measurement times $T_m$ are determined by the division factor N in the Divider (27). Information from the counter passes through the decoder (26) and enters the computer CPU. In PDN (Public Digital Network) similar information will be sent from other BSs, which are participating in the location of MS calculations.

FIG. 4a and FIG. 4b show a partial diagram of single MS communicating with BS. It shows high-frequency RF-Stage Receiver, low-frequency IF-Stage Transmitter and various circuits of multi-channel BS transmitter. Spreading of signal on route from BS to MS contributes to signal delay in the synchronization system. MS signal delay is corrected in the PLL frequency Synthesizer (5) which also monitors MS signal frequency and phase delay.

It is possible to locate MSs by the TOA method if the cellular communication system is synchronized and all BSs equipped with the PLL synthesizers are participating in location measurements. When this condition is not present due to mutual frequency and phase delay, the TOA measurements will become inaccurate.

In non-synchronized cellular communication systems such as GSM (TDMA), we propose to add an additional antenna with communication channel on each BS that will be participating in determination of location of MSs. The inventive device shown in FIG. 6a and FIG. 6b contains: two broadband antennas A1,1 and A1,2 which are installed on one base station BS1, see also FIG. 3b, one channel in RF Stage Receiver 1 with high-frequency circuits for RF1 conversion, and IF Stage Receiver 1 for low-frequency conversion, and another channel with RF and IF Stage Receivers 2, and Digital Clock (8) in FIG. 6b for signal synchronization.

High-frequency circuits for frequency conversion RF1 and RF2 contain: Bandwidth filters (1) single-line amplifiers (2), mixers (3), and the general source heterodyne voltages—PLL Frequency Synthesizer (4). Circuits for frequency conversion in IF1 and IF2 in IF Stage receiver 2 contain: single-line amplifiers, mixers, shifters, divider of frequencies, low-pass filters.

The digital signal block in FIG. 6b contains analog-to-digital ADC-converters (9), PN Descramler (10), signal-coordinated correlators (11) and (12) (matched filters). The inventive device functions as follows.

MS signals enter the two antennas A1,1 and A1,2 located on the monitoring BS1. If the MS is located in a distant network cell, the electromagnetic wave front arrives earlier to antenna A1,1 than to antenna A1,2. Their relationship may be described by the right-angled triangle BCD, from which the time lag may be calculated as $$\Delta\tau=(D\sin(\alpha))/c=(D\cos(\beta))/c$$

where D is the distance between antennas in single BS, $\alpha$ the angle of reception of the electromagnetic wave front, $\beta=90°-\alpha$. Phase shift between signals in antennas is expressed by:

$$\phi=\omega_0\Delta\tau=2\pi f_0(D/c)\cos(\beta)=(2\pi D)/\lambda_0 \cos(\beta)$$

where $f_0=1/T_0=\omega_0/2\pi$, $\lambda_0=c/f_0$ is frequency and duration of carrier wavelength. If the distance between antennas is $D<\lambda_0/2$, time lag can be defined by a phase method. In this case measuring time block may be used as a phasemeter for measurement limits 0–360°. Under such a small distance between dipoles, the antenna functions as a simple array antenna. When $D>\lambda_0/2$, the phase measurements become ambiguious since $\Delta\tau>T_0$ and $\phi=2\pi k+\phi_{iz}$ CDMA, f=900 Mhz, $\lambda_0=30$ cm, $T_0=0.99*10^{-8}$ sec. Ambiguity in the distance measurements is repeated at intervals $d_0=cT_0=2.97$ m, $d=kd_0+d_{iz}$, $d_{iz} \leq cT_0$, where $\phi_{iz}$, $d_{iz}$ are the measurements of phase shifts and distance respectively.

For eliminating ambiguities and improving accuracy of distance measurements, we propose to combine TDOA measurements with phase difference measurements. Signals from antennas A1,1 and A1,2 enter into high-frequency dual-channel RF Stage Receiver in which the signals are transformed from carrier high-frequencies to the intermediate frequency $f_{pr}=270$ Mhz. The software controlled PLL frequency synthesizer (4) is used as signal from heterodyne receiver. Low IF stage receiver transforms synchronously high frequency signals into low frequencies, and then into digital signals by means of the analogue-digital converters ADC (9). The signal from frequency divider (6) is used as a heterodyne signal that is then passed through and over to Mixer (3) and to Shiffers (5). Low frequency signals are produced and divided in mixers (3) and low frequency filters (7). Digital signals are subdivided by means of decoder (10) by time-coding and id-coding for the given MS $r_j$ and enter correlators 11 and 12 for first and second channels. Short pulses starting from flip-flop trigger (15) are formed by means of treshold devices (13) and (14) and from matched-filters generated responses. Square-wave pulse is an output from trigger (15) and is proportional to propagation wave-delay due to the distance from MS to BS.

Duration of pulses is measured by means of pulse-counter from the oscillator (20) as they enter through logical multiplier devices (16) and (17) when input equals logical "1" as received from the window-frame monitor in CDMA (22), trigger (15), frequency divider (24) and oscillator (20) in FIG. 6a. Pulse packets from multiplier-logical device (16) are counted by the counter (23) with the time interruptions. Accuracy of location measurement of MS depends on duration of measurement process $T_m$. This time is determined by the pulse duration with frequency divider (24).

Signal exchange between BS and MS in the monitoring mode is on DCCH (Digital Control Channel) which provides synchronization of frequency FCCH (Frequency Correction Channel) and SCH (Synchronization Channel) for time delay compensation.

Response signal will be sent on the special PCS channel from MS to each BS. Device (22) forms a video-pulse of window-frame interval in the CDMA PCS channel. It is possible to form similar video-pulse from digital signal oscillator (Digital Clock). Measurement duration of time-interval process $T_m=N*T_{cr}$ can be changed by assigning different coefficient factors N by divider (24). The number of pulses, which are accumulated in counter (23) for measurement times $T_m$ can be calculated as $C=10^{n}*p(\Delta\tau/T_{cr})$, hence $\Delta\tau=CT_{cr}/(p*10^n)$, where p represents the amount of time intervals for time $T_m$, n is an integer, and $\Delta\tau/T_{cr}$ is the number of pulses in the measured interval $\Delta\tau$. Pulses pass through the decoder (19) and are transmitted to Location Database Server ADS) (4) (FIG. 1a) via digital interface. Similarly, digital information on the values $\Delta\tau_1$, $\Delta\tau_2$, ..., $\Delta\tau_N$ received on base stations BS1, BS2, ..., BSN enters the LDS (4) (FIG. 1a) for calculation of the MS coordinates.

Naturally, additional equipment in existing BSs will be required for TDOA calculations and therefore it may be necessary to allocate more time for position requests access calls. An advantage of this method is in improvement of $\Delta t$ measurements since BS receiver's channels are identical with respect to delays.

It is possible to estimate the azimuth location of an MS by using array antennas. If the distance D between antennas A1,1 and A1,2 is known, and the wave phase front WPF direction of lines A1,1 and A1,2 (FIG. 6a) can be estimated accurately enough, the position of the MS can be calculated. When the values of D, $\beta$ and $\gamma$ are known, the AOA method can be applied for calculating the distance from MS to A1,1 or to A1,2. This method requires improved antenna systems and electronic beam control of receiving electromagnetic waves. The TOA, AOA and TDOA methods may bring in the following inaccuracies:

1. Inaccuracies due to a finite front of pulses formed by threshold devices, which are determined by the level of receiver noises and channel interference. The minimum threshold is defined by the signal resolution mp that is calucated as $$m_p = E/N_0 = P_{s\,min}/(P_{min}B) \quad (3)$$

where E is the energy of bit of information signal, $N_0$ the energy of noise, B the signal base, $P_{s\,min}$ the minimum power of signal ensuring reliable measurement (sensitivity of receiver—116 db), $P_{min}$ the noise power of receiver's input. For mobile communication CDMA systems: $P_{s\,min}=4*10^{-11}$ Bt, $P_{min}=kTF_nG=6*10^{-14}$ Bt, where F is the noise bandwidth of receiver $1.5*10^6$ Hz, G the receiver's noise coefficient 7–10 db, B=F/C=130, where F is receiving channel bandwidth (1.25 Mhz), C the rate of information transferral (9.6 Kbit/sec). From the formula (3) we obtain $m_p=5.12$. It follows then that more then ⅕of responses from matched-filter will be impossible to use as response-pulses for the trigger (15). If the initial threshold level from filter (15) equals 0.9 from the beginning of the response-pulse, then the duration of pulse is $0.1*t_b$, where $t_b$ is the duration of bit of information signal data. The duration of response pulse can be expressed as $\Delta T_1=0.82*10^{-7}$ sec when the repetition frequency of noise-image of signal equals 1.238 MHz. After having calculated the value $m_p*B=665.6$, it is possible to determine the probability of correct measurement of time interval $P_{cm}=0.94$ (Skolnic, M. J. Radar Handbook, vol. 1, McGraw-Hill, 1970).

2. Errors due to discreteness of measurements of time interval $\tau$ or $\Delta\tau$ for one cycle that are determined by the period of pulse repetitions from the oscillator (24) in FIG. 5a.

The error of measurement increases p times as it is proportional to p measurement repetitions in window-frames in CDMA. This error will be averaged over the measurement process. The resulting inaccuracy will be equal to $T_{cr}\sqrt{p}=\Delta T_2$. When the frequency of oscillator (24) is 100 Mhz, and the number of time lags is p=50, the error will be $\Delta T_2=7*10^{-8}$ sec.

3. Errors due to delays in flip-flop trigger (15) (FIG. 6a) which for most micro-circuits are approximately $\Delta T_3 = 10$ ns. The total error of time lag measurements will be $\Delta T_\Sigma = 162$ ns with probability 0.94. This corresponds to the error $\Delta T_\Sigma*C=48.6$ m in range determination. Signal delay that appears in standard BS receiver channels can also be measured and included as systematic equipment delay since it does not vary much between MSs.

The use of TOA and TDOA methods in the standard TDMA/FDMA systems brings about dramatic decrease of accuracy due to narrow bandwidth F=200 Khz. Indeed, it is 6 times less precise than measurements achieved in the standard IS-95 (CDMA) so that in general, the errors may be 300 m or more. Intelligent mathematical application based on wireless 3D hyperbolic trilateral location method for determining cell phone position and filtering out possible position ambiguities Radiolocation systems attempt to locate a MS by measuring propagation times of the radio signals traveling between the MS and a fixed set of BSs. There are three major types of radiolocation systems: those based on signal strength, or attenuation methods (AT), those based on angle of arrival (AOA), and those measuring time of arrival (TOA or TDOA).

Typically, signal measurements are used to determine the length or direction of paths to/from a MS from/to multiple BSs, and then geometrical relationships are used to determine the location. The lines of position are the curves that describe the possible location of the MS with respect to a single BS for each of those methods. Each of the lines of position can be described mathematically using the relative geometry of the BSs and MS, while intersection of those lines indicates the presumed location of the MS. The same principles could and have been used to determine locations of cell phones. However, in order to achieve good accuracy in location estimates, it is necessary that line of sight paths exist between the MS and the BSs that are utilized in the location process, and a minimum of three BSs are available for the purpose. These conditions can by no means be always assumed in real situations, especially in urban areas where ambiguities arising from multiple crossings (multipaths) are very common. Therefore, various combinations of the above mentioned methods will be used for exhaustive utilization the existing data on the one hand, and for filtering out possible false locations on the other. For convenience, the situations involving different numbers of available BSs together with appropriate methods or combinations thereof will be considered one by one starting with the cases of a single BS. The general scheme of computations is shown in the flowchart in FIG. 1. From now on, it will be assumed that coordinates of locations of all BSs are stored in the database and are available to the relevant algorithms.

Case of a Single Base Station (Unit 2 in FIG. 8)

To determine location of MS in this case, a combination of AOA and AT methods may be used as illustrated in FIG. 9. The techniques used in the AOA method determine the direction of MS relative to the BS, which is a narrow sector between two rays while the AT estimates the distance, i.e., gives a narrow band between two circles with their centers at the BS. Their intersection defines a small hatched region in FIG. 2 where the MS is assumed to be located. The resulting location cannot be considered as very reliable as the data are too scanty to attempt any checkups, and no protection against multipath propagation or signal distortion could be provided.

Case of Two Base Stations (Unit 4 in FIG. 8)

In this case we can use both AOA and AT methods. In general we have here seven points of intersection for the MS location point (see FIG. 10):

A is the point of intersection of the two rays in the AOA method; $B_1$ and $B_2$ are two points of intersection of the first ray with two circular lines corresponding to two BSs in the AT method; $B_3$ and $B_4$ are similar points for the second ray; and $C_1$ and $C_2$ are two points of intersection of the two circular lines.

First, we can consider the group of points A, $B_1$, $B_2$, $B_3$, $B_4$, and decide whether they are close enough based on some adopted tolerance criterion. If they are, we can compute the center of the group (by averaging the coordinates of the points) and take it as a candidate for location estimator $L_1$, otherwise we declare the location undetermined. Second, we can choose the nearest of the two points $C_1$ and $C_2$, in FIG. 10, it is $C_1$. Now we can compute the center of the group A, $B_1, B_2, B_3, B_4, C_1$, and adopt it as the final location estimator L.

Alternatively, robust methods could be used here as described in 'Redundancy, Ambiguity, and Robust Location Estimators' below. They have an obvious advantage of being able of producing sensible results even in the presence of outliers, i.e., gross measurement or other errors.

Case of Three Base Stations (Unit 6 in FIG. 8)

In this case, both the AOA and the AT could be used for all three BSs. The AOA produces three intersections of three pairs of rays i.e., three candidate points for a location (see FIG. 11a), while the AT produces six intersections of three pairs of circular lines (see FIG. 11b).

First, we consider the three candidate points produced by AOA. If they are close by our tolerance criterion, we will compute their center $L_1$, otherwise they are discarded.

Similarly, we select three closest points among three pairs in the AT method (one from each pair), and if they are close enough, compute their center, say $L_2$. If both $L_1$ and $L_2$ have been able to be computed, the final estimate of location could be compute as their weighted average $$L=\alpha_1 L_1+\alpha_2 L_2$$

where the weights $\alpha_1$ and $\alpha_2$ reflect the degree of our faith in the reliability of the corresponding estimates. This could be done in more than one way, in particular, the standard Kalman filter could be exploited here.

Figure 12A:
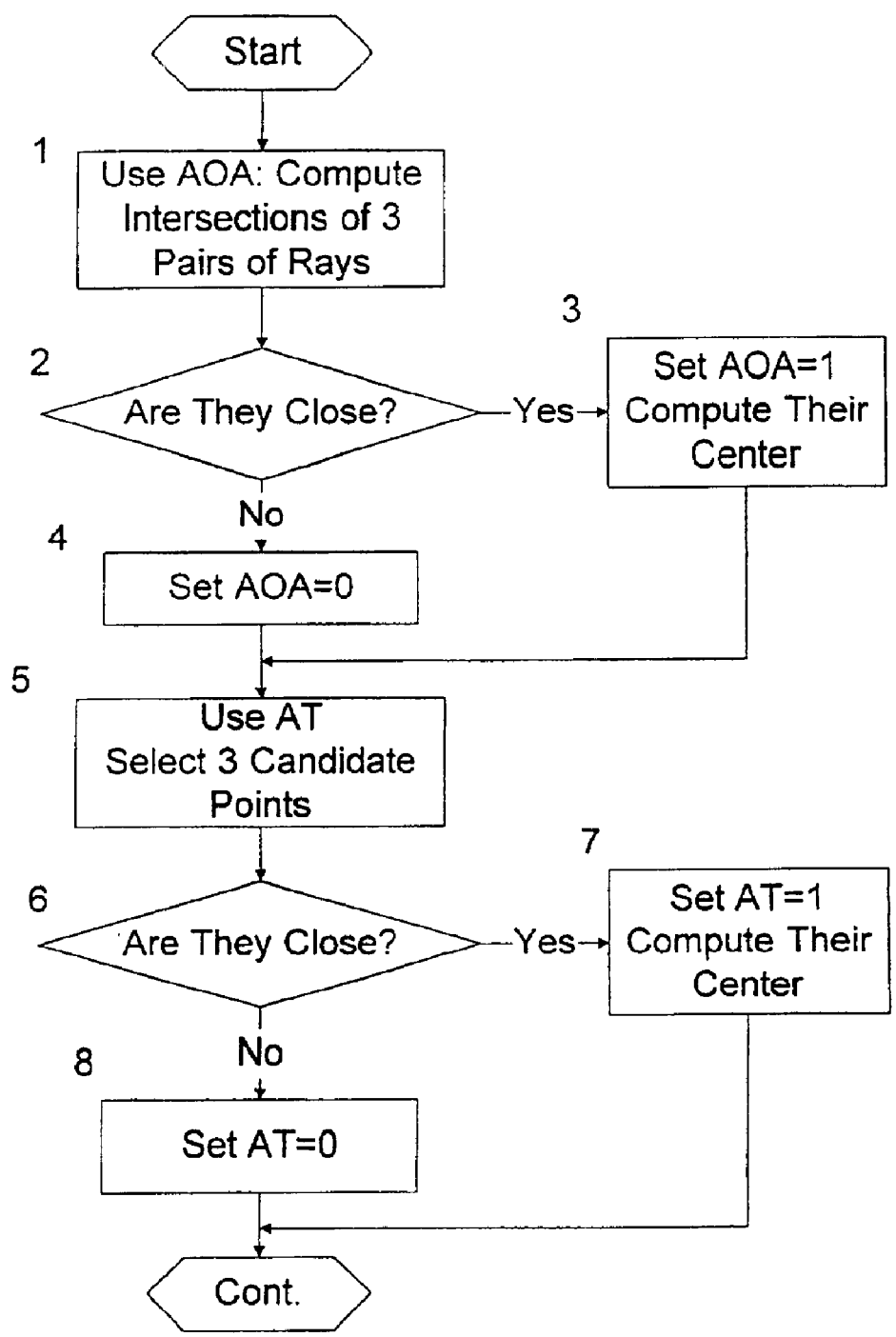
FIG. 12a: Computations for Case of Three Base Stations
Figure 12B:
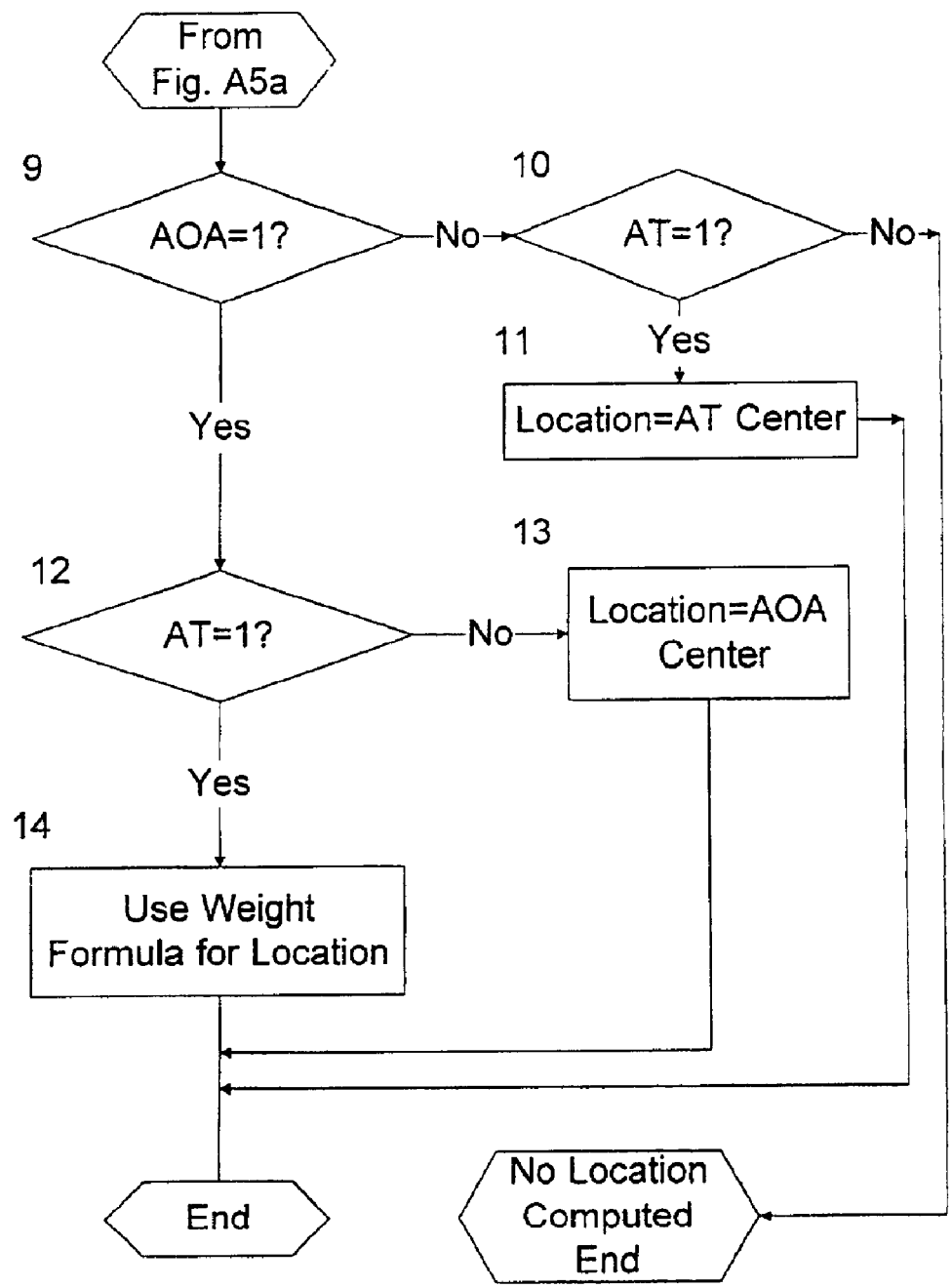
FIG. 12b: Computations for Case of Three Base Stations (cont.)

The flow of computation is shown in FIGS. 12a–12b.

In Unit 1, the AOA method computes the three intersections of three pairs of rays. If they are close (Unit 2), the indicator variable AOA is set to 1, and the center of the group $L_1$ is computed in Unit 3, otherwise the indicator variable AOA is set to 0 in Unit 4.

In Unit 5, the AT method computes the six intersections of three pairs of circular lines. If they are close (Unit 6), the indicator variable AT is set to 1, and the center of the group $L_2$ is computed in Unit 7, otherwise the indicator variable AT is set to 0 in Unit 8.

Now if both indicator variables AOA and AT equal 1 (Units 9 and 13), the weight formula above is used for computing the location in Unit 16.

If AOA=0 but AT=1 (Unit 10), the location is set equal to the center of group computed by AT method in Unit 11.

If AOA=1 but AT=0, the location is set equal to the center of group computed by AOA method in Unit 14.

Finally, if both AOA and AT are zero (Units 9 and 13), no location is computed (Unit 12).

Case of Four Base Stations (Unit 8 in FIG. 8)

Four base stations will allow using the TDOA method for computing 3-dimensional locations of MSs, see FIGS. 7 and 13.

Location signals emitted by a MS are registered by four synchronized base station BST dual vibration antennas with their start/stop arrival times. The differential times of arrival of these signals to BSs can be measured with high precision (e.g. 50 nanoseconds) via GPS clock in the timing block (see above). Using these differential times collected from four BSs, the application is able to compute 3-dimensional location of the MS. This direct method gives explicit (x, y, z) location of the MS and in that differs from existing methods, which rely on approximations.

To handle ambiguities in case of two or more solutions or/and multipath effects, it may be necessary to use additional base stations, or other location methods such as Angle of Arrival (AOA) and Attenuation Method (AT), see below.

FIG. 13 shows the most general mutual configuration of four BSs and an MS. The paired differences of distances traveled by signals may be expressed as follows:

$$MB_1-MB_2=D_{12}$$

$$MB_1-MB_3=D_{13}$$

$$MB_1-MB_4=D_{14}$$

where $MB_1$ is the distance between the base station $B_1$ and the moving station M, etc.

The differences $D_{12}$ . . . can be written as $D_{12}=c^*(T_1-T_2)$, . . . where c is the speed of electromagnetic propagation, $T_1$ the propagation time from $B_1$ to M, etc. Denoting the coordinates of the base station $B_i$ by $(x_i, y_i, z_i)$ for i=1,2,3,4, and the coordinates of the MSM by (x, y, z), these equations can be transformed in the following equations $$((x-x_1)^2+(y-y_1)^2+(z-z_1))^{1/2}-((x-x_2)^2+(y-y_2)^2+(z-z_2)^2)^{1/2}=D_{12}$$

$$((x-x_1)^2+(y-y_1)^2+(z-z_1))^{1/2}-((x-x_3)^2+(y-y_3)^2+(z-z_3)^2)^{1/2}=D_{13}$$

$$((x-x_1)^2+(y-y_1)^2+(z-z_1))^{1/2}-((x-x_4)^2+(y-y_4)^2+(z-z_4)^2)^{1/2}=D_{14}$$

Figure 14:
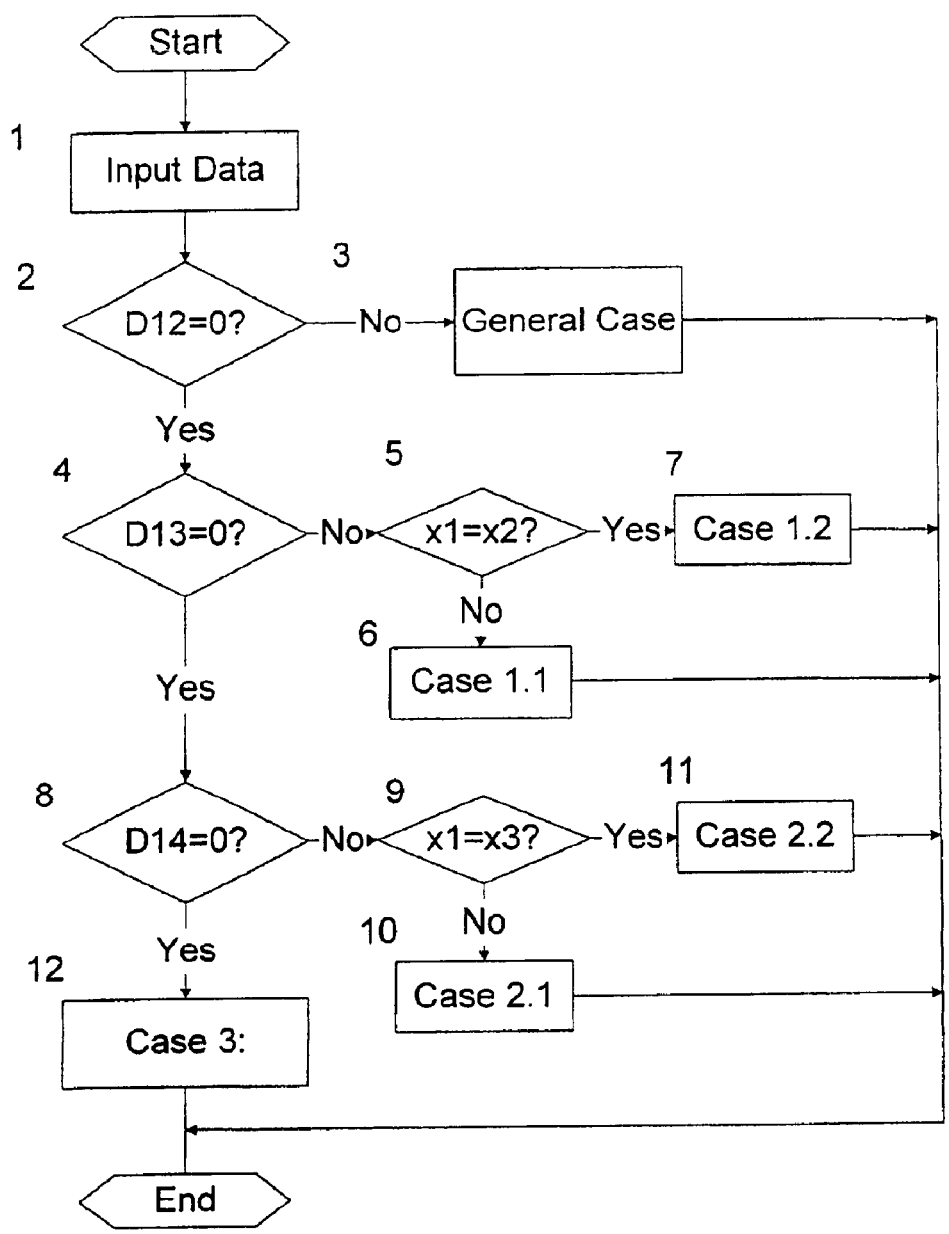
FIG. 14: Computations for Case of Four Base Stations

These equations can be solved directly in the general case as shown below. Besides, there are a number of particular cases in which the computations above can be considerably simplified so that they merit a separate consideration (see FIG. 14). These particular cases are identified by conditions like $D_{12}=D_{13}$, $D_{12}=D_{13}=D_{14}$, etc. and will be listed ahead along with the corresponding solutions. We begin though by giving the direct solution of these equations in the most general case.

$$x=A+B^*z$$

$$y=C+D^*z$$

$$z=(-H\pm(H^2-G^*I)^{1/2})/G$$

(see Redundancy, Ambiguity, and Robust Location Estimators below).

Here $$A=(b_{123}^*R-d_{123}^*P)/(a_{123}^*P)$$

$$B=(b_{123}^*Q-c_{123}^*P)/(a_{123}^*P)$$

$$C=-R/P$$

$$D=-Q/P$$

$$E=(B^*(x_2-x_1)+D^*(y_2-y_1)+z_2-z_1)/D_{12}$$

$$F=0.5^*(S_1-S_2-D_{12}^2+2^*A^*(x_2-x_1)+2^*C^*(y_2-y_1))/D_{12}$$

$$G=E^2-B^2-D^2-1$$

$$H=E^*F-B^*(A-x_2)-D^*(C-y_2)+z_2$$

$$I=F^2-(A-x_2)^2-(C-y_2)^2-z_2^2$$

$$P=-a_{123}^*b_{124}/a_{124}+b_{123}$$

$$Q=-a_{123}^*c_{124}/a_{124}+c_{123}$$

$$R=-a_{123}^*d_{124}/a_{124}+d_{123}$$

$$a_{123}=2^*(x_1-x_2)/D_{12}-2^*(x_1-x_3)/D_{13}$$

$b_{123}=2*(y_1-y_2)/D_{12}-2*(y_1-y_3)/D_{13}$ $c_{123}=2*(z_1-z_2)/D_{12}-2*(z_1-z_3)/D_{13}$ $d_{123}=(S_2-S_1-D_{12}^2)/D_{12}+(S_3+S_1+D_{13}^2)/D_{13}$ $a_{124}=2*(x_1-x_2)/D_{12}-2*(x_1-x_4)/D_{14}$ $b_{124}=2*(y_1-y_2)/D_{12}-2*(y_1-y_4)/D_{14}$ $c_{124}=2*(z_1-z_2)/D_{12}-2*(z_1-z_4)/D_{14}$ $d_{124}=(S_2-S_1D_{12}^2)/D_{12}+(S_4+S_1+D_{14}^2)/D_{13}$ $S_1=x_1^2+y_1^2+z_1^2$ $S_2=x_2^2+y_2^2+z_2^2$ $S_3=x_3^2+y_3^2+z_3^2$ $S_4=x_4^2+y_4^2+z_4^2$

Although these formulas are valid in the most general case, we consider now a number of particular cases in which the computations above can be considerably simplified. The conditions under which those cases are valid make a set of nested condition starting with $D_{12}=D_{13}$. We will be always assuming that equality conditions are listed first, and in a case of $D_{12}\neq 0$, $D_{13}=0$, for example, relabelling should be done first.

All particular cases are obtained by assuming $D_{12}=0$.

Case 1: $D_{12}=0$, $D_{13}\neq 0$, $D_{14}\neq 0$

Two subcases will be distinguished here: Case 1.1 and Case 1.2.

Case 1.1: $x_1 \neq x_2$ and $y_1 \neq y_2$

In this case, the coordinates of a MS can be computed by the formulas:

$x=A+B*z$ $y=C+D*z$ whereas z is computed as $z=J/G$ or as $z=I/J$ (see Redundancy, Ambiguity, and Robust Location Estimators below)

Here the symbols A, B, C, etc. have the following values $A=((z_2-z_1-C*(y_2-y_1))/(x_2-x_1)$ $B=\frac{1}{2}(S_2-S_1)/(x_2-x_1)-D*(y_2-y_1)/(x_2-x_1)$ $C=(K*(z_2-z_1)-M*(x_2-x_1))/(K*(y_2-y_1)-L*(x_2-x_1))$ $D=(\frac{1}{2}K*(S_2-S_1)-N*(x_2-x_1))/(K*(y_2-y_1)-L*(x_2-x_1))$ $E=(B*(x_4x_1)+D*(y_4-y_1)+z_4-z_1)/D_{14}$ $F=0.5*(S_1-S_4-D_{14}^2+2*A*(x_4-x_1)+2*C*(y_4-y_1))/D_{14}$ $G=E^2-B^2D^2-1$ $H=2*(E*F-B*(A-x_4)-D*(C-y_4)+z_4)$ $I=F^2-(A-x_4)^2-(C-y_4)^2-z_4^2$ $J=-H/2-\text{sign}(H)*(H^2-G*I)^{1/2}$ $K=(x_1-x_3)/D_{13}-(x_1-x_4)/D_{14}$ $L=(y_1-y_3)/D_{13}-(y_1-y_4)/D_{14}$ $M=(z_1-z_3)/D_{13}-(z_1-z_4)/D_{14}$ $N=\frac{1}{2}(S_4-S_1-D_{14}^2)/D_{14}-\frac{1}{2}(S_3-S_{1-D13}^2)/D_{13}$ Case 1.2: $x_1=x_2$ and $y_1 \neq y_2$.

In this case, the coordinates of a MS can be computed by the formulas:

$x=A+B*z$ $y=C+D*z$ whereas z is computed as $z=J/G$ or as $z=I/J$ (see Redundancy, Ambiguity, and Robust Location Estimators below).

Here the symbols A, B,C, etc. have the following values:

$A=((z_1-z_4)/D_{14}-(z_1-_3)/D_{13}-(z_1-z_2)/(y_2-y_1))/K$ $B=\frac{1}{2}((S_4-S_1-D_{14}^2)/D_{14}-(S_3-S_1-D_{13}^2)/D_{13}-L*(S_2-S_1)/(y_2-y_1))/K$ $C=(z_1-z_2)/(y_2-y_1)$ $D=\frac{1}{2}(S_2-S_1)$ $E=(B*(x_4-x_1)+D*(y_4-y_1)+z_4-z_1)/D_{14}$ $F=0.5*(S_1-S_4D_{14}^2+2*A*(x_4-x_1)+2*C*(y_4-y_1))/D_{14}$ $G=E^2-B^2-D^2-1$ $H=2*(E*F-B*(A-x_4)-D*(C-y_4)+z_4)$ $I=F^2-(A-x_4)^2-(C-y_4)^2-z_4^2$ $J=-H/2-\text{sign}(H)*(H^2-G*I)^{1/2}$ $K=(x_1-x_3)/D_{13}-(x_1-x_4)/D_{14}$ $L=(y_1-y_3)/D_{13}-(y_1-y_4)/D_{14}$ Case 2: $D_{12}=D_{13}=0, D_{14}\neq 0$ In this case, we will also consider two subcases.

Case 2.1: $x_1 \neq x_3$ and $y_1 \neq y_3, x_1 \neq x_2$

Here x and y are computed by the formulas above $x=A+B*z$ $y=C+D*z$ whereas z is computed as $z=J/G$ or as $z=I/J$ The symbols A, B, C, etc. have the following values $A=(L*(z_1-z_2)-M*(y_1-y_2))/(L*(x_2-x_1))$ $B=\frac{1}{2}(S_2-S_1-N*(y_2-y_1)/L)/(x_2-x_1)$ $C=-M/L$ $D=N/L$ $E=C*(x_4-x_1)+A*(y_4-y_1)+z_4-z_1$ $F=(D-x_1)^2-(D-x_4)^2+(B-y_1)^2-(B-y_4)^2+z_1^2-z_4^2-D_{14}^2$ $G=C^2+A^2-E^2+1$ $H=2*(C*(D-x_4)+A*(B-y_4)-z_4)-E*F/D_{14}$ $I=(D-x_4)^2+(B-y_4)^2+z_4^2-\frac{1}{4}*F^2/D_{14}^2$ $J=-H/2-\text{sign}(H)*(H^2-G*I)^{1/2}$ Case 2.2: $x_1=x_3$ and $y_1\neq y_3$, $x_1\neq x_2$ Here x and y are computed by the formulas above $x=A+B*z$ $y=C+D*z$ whereas z is computed as $z=J/G$ or as $z=I/J$ The symbols A, B, C, etc. have the following values:

$A=(z_1-z_3)/(y_3y_1)$ $B=\frac{1}{2}(S_3-S_1)/(y_3-y_1)$ $C=(A*(y_1-y_2)-(z_2-z_1))/(x_2-x_1)$ $D=(\frac{1}{2}*(S_2-S_1)-B*(y_2-y_1))/(x_2-x_1)$ $E=C*(x_4-x_1)+A*(y_4-y_1)+z_4-z_1$ $F=(D-x_1)^2-(D-x_4)^2+(B-y_1)^2-(B-y_4)^2+z_4^2-D_{14}^2$ $G=C^2+A^2-E^2+1$ $H=2*(C*(D-x_4)+A*(B-y_4)-z_4)-E*F/D_{14}$ $I=(D-x_4)^2+(B-y_4)^2+z_4^2-\frac{1}{4}*F^2/D_{14}^2$ $J=-H/2-\text{sign}(H)*(H^2-G*I)^{1/2}$ Case 3: Equirange Configuration $D_{12}=D_{13}=D_{14}=0$ In this case, the coordinates of a MS can be computed by the formulas $x=-\Delta_x/\Delta$ $y=-\Delta_y/\Delta$ $z=-\Delta_z/\Delta$ where $$\Delta_x = 1/2 \begin{vmatrix} S_1-S_2 & y_2-y_1 & z_2-z_1 \\ S_1-S_3 & y_3-y_1 & z_3-z_1 \\ S_1-S_4 & y_4-y_1 & z_4-z_1 \end{vmatrix}$$

$$\Delta_y = 1/2 \begin{vmatrix} S_1-S_2 & x_2-x_1 & z_2-z_1 \\ S_1-S_3 & x_3-x_1 & z_3-z_1 \\ S_1-S_4 & x_4-x_1 & z_4-z_1 \end{vmatrix}$$

$$\Delta_z = 1/2 \begin{vmatrix} S_1-S_2 & x_2-x_1 & y_2-y_1 \\ S_1-S_3 & x_3-x_1 & y_3-y_1 \\ S_1-S_4 & x_4-x_1 & y_4-y_1 \end{vmatrix}$$

$$\Delta = \begin{vmatrix} x_2-x_1 & y_2-y_1 & z_2-z_1 \\ x_3-x_1 & y_3-y_1 & z_3-z_1 \\ x_4-x_1 & y_4-y_1 & z_4-z_1 \end{vmatrix}$$

The last determinant $\Delta$ is nonzero as the four base stations do not lie on a straight line.

Redundancy, Ambiguity, and Robust Location Estimators

The TDOA method described above gives in general two candidate points for a MB position in the four base stations case (see formulas for z above). Other location methods could be used here as well.

Thus, the AOA method could be applied for the six paired combinations of base stations producing additional candidate points, and the attenuation method would also give a number of feasible locations. The total set of candidate locations would have to be sorted out because of presence of probable outliers resulting from gross from measurement errors, multipath phenomena, etc. So that redundant candidate points can actually help to improve on location estimators.

Assume that we obtained a group of points $(x_1, y_1), (x_2, y_2), \ldots (x_n, y_n)$ as candidates for the BS position. One feasible estimator of MS location is the median of the group. i.e., the point $M=(x_M, Y_M)$ where $x_M$ and $Y_M$ are computed as medians of the corresponding coordinates:

$x_M=\text{median}(x_1, x_2, \ldots, x_n)$
$y_M=\text{median}(y_1, y_2, \ldots, y_n)$ The corresponding unit is Unit 10 in FIG. 8.

Case of More Than 4 BSs (Unit 9 in FIG. 8)

In such cases the matters are not much different from the case of four base stations. The TDOA method can be used in conjunction with various paired combinations of four bases stations, and other methods could be applied as well together with computations described in context of redundancy and ambiguity.

Refinements and Future Embodiments

The inventive method and Location Device LD for mobile communication systems can be expanded for use in all digital technologies—TDMA, CDMA and GSM. As described herein, any cellular system, which is synchronized by, system timing input can be equipped with fixed location-finding, stand-alone LDs. For unsynchronized networks, the signals are also received and Ms position is deduced geometrically from time delays measured at LD between MS and BS.

In ETSI TS 101 528 GSM (Version 8.1.0) Location services are enhanced by assistance data broadcast messages from the Serving Mobile Location Center (SMLC) and the Mobile Station (MS). In this and previous versions many concepts such as Location request broadcasts from SMLC and MS-originating self-position requests are introduced into Phase 2+ Digital cellular communications (GSM) system procedures. Similarly, all known position methods such as TOA, Enhanced Observed Time Difference (E-OTD) and GPS positioning are utilized to deal with particular MS location determinations. As described herein, the present invention provides a comprehensive approach to location of multiplicity of MSs in order to accumulate large storage of MS position data in real time for ITS evaluations. It is hoped that by optimizing location techniques and their traffic loads on existing and future communication networks will advance and facilitate our goals.

What is claimed is:

1. A method for location determination of mobile cell phones utilizing a plurality of base stations comprising the steps of:
    a. transmitting a positioning request signal from a base station to a specified mobile cell phone;
    b. receiving at each of said plurality of base stations a positioning response signal from said specified mobile cell phone to said base stations;
    c. calculating at each of said plurality of base stations, a time delay value representing the time interval between transmission of a parcel of data from said mobile cell phone to said base stations, using a location device within each of said plurality of base stations,
    d. transmitting said time delay values to a location database server; and
    e. estimating the position of the mobile cell phone from data received at said location database server from each of said plurality of base stations;
wherein the step of estimating the position of the mobile cell phone from data received at said location database server from each of said plurality of base stations employs a redundancy algorithm chosen to be consistent with the number of said plurality of base stations used for determining the mobile cell phone position, and comprises the steps of:
    i. compiling location information from each location device within each base station;
    ii. using said location information as input data to a calculation based on a wireless 3D hyperbolic model;
    iii. using said redundancy algorithm to calculate the estimated position of the mobile cell phone.
whereby a determination of the location of the mobile cell phone is generated.

2. The method of claim 1, wherein the number of base stations is two, and the redundancy algorithm comprises the steps of:
    a. identifying two rays, one from each base station, derived from angle-of-arrival of signal;
    b. identifying two circular lines, one from each base station, calculated from attenuation of signal;
    c. deriving a set of points based on the intersections of the rays and circular lines so identified;
    d. calculating an intermediate location estimator by averaging the points so derived;
    e. identifying the closest endpoint as the intersection of the two circular lines that is closest to the intermediate location estimator; and
    f. calculating a final location estimator by averaging the intermediate location estimator with the closest endpoint.

3. The method of claim 1, wherein the number of base stations is three, and the redundancy algorithm comprises the steps of:
    a. identifying three rays, one from each base station, derived from angle-of-arrival of signal;
    b. deriving a set of three points at the intersection of the rays so identified;
    c. calculating a first intermediate location estimator based on the set of points so derived;
    d. identifying three circular lines, one from each base station calculated from attenuation of signal;
    e. deriving a set of four points from the intersection of the three circular lines;
    f. calculating a second intermediate location estimator from the set of four points so derived; and
    g. calculating a final location estimator using a weighted average of the first and second location estimators.

4. The method of claim 1, wherein the number of base stations is four, and the redundancy algorithm comprises the steps of:
    a. receiving at each base station, a location signal using a BTS dual vibration antenna at each base station;
    b. measuring the time difference of arrival of the location signal among the four base stations; and
    c. transmitting the time difference of arrival as input data to the location database server;
whereby the location database server computes the three-dimensional location of the mobile cell phone based on the input data.

5. The method of claim 4, wherein the mobile cell phone is substantially equidistant from all four base stations, wherein the step of estimating the position of the mobile cell phone further comprises the step of performing an equirange configuration calculation.

6. A system for location determination of mobile cell phones utilizing a plurality of base stations comprising:
    a. first transmission means for transmitting a positioning request signal from a base station to a specified mobile cell phone;
    b. receiving means for receiving a positioning response signal from said specified mobile cell phone to said base stations;
    c. calculating means for calculating at each of said plurality of base stations, a time delay value representing the time interval between transmission of a parcel of data from said mobile cell phone to said base stations, using a location device within each of said plurality of base stations;
    d. second transmission means for transmitting said time delay values to a location database server; and
    e. estimation means for deriving the position of the mobile cell phone from data received at said location database server from each of said plurality of base stations;
wherein said estimation means comprises a location device, a plurality of correlators within each said location device, a plurality of threshold devices, each said correlator having its output fed to the input of a respective threshold device, the output of each said threshold device and the output of time slot window frames being input to a timing block, the output of said timing block being fed to a microprocessor, and a computer-readable medium containing instructions for execution by said microprocessor to calculate an estimated mobile cell phone position.

7. The system of claim 6, wherein the timing block comprises a plurality of logic-multiplier devices forming a conditioning circuit, said circuit receiving digital signals from output of at least one of said correlator, said circuit outputting pulses to the input of a counter module, whereby the counter module counts the number of pulses received during a predetermined duration, said number of pulses being used as an input to a microprocessor which performs calculations to compute a timing signal.

8. The system of claim 6, wherein the location device comprises a first receiver and first antenna and a second receiver and second antenna, the distance between the antennas being known, output of said second receiver being fed to a CDMA correlator, output of said CDMA correlator being fed to a timing block, whereby the timing block derives a time-difference-of-arrival timing signal.

9. The system of claim 8, wherein the output of the first and second receivers are fed to a phase meter, whereby the phase meter measures the differences between signals in the first antenna and second antenna.

10. The system of claim 9, wherein an assembly generating an input to the phase meter comprises:
   a. a first logic circuit;
   b. a second logic circuit; and
   c. an oscillator operating at $36.10^n$ Hz, where n is an integer;

wherein output of said oscillator is fed into a divider, and also fed into said second logic circuit; output of said second logic circuit is fed into said first logic circuit; output of said first logic circuit is fed into a counter; output of said counter is fed into a descrambler; and output of said descrambler is transmitted to the location database server; whereby the location data base server performs further processing to estimate the location of the specified mobile cell phone.

* * * * *